(12) United States Patent
Tsuyuki et al.

(10) Patent No.: US 6,959,888 B2
(45) Date of Patent: Nov. 1, 2005

(54) MAGNETIC TAPE CARTRIDGE

(75) Inventors: Seiji Tsuyuki, Kanagawa (JP); Yusuke Ishihara, Kanagawa (JP); Yasushi Hatano, Kanagawa (JP); Hidetoshi Yamamoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 60 days.

(21) Appl. No.: 10/716,906

(22) Filed: Nov. 20, 2003

(65) Prior Publication Data
US 2004/0099758 A1   May 27, 2004

Related U.S. Application Data

(62) Division of application No. 10/173,867, filed on Jun. 19, 2002, now Pat. No. 6,851,169.

(30) Foreign Application Priority Data

| Jun. 25, 2001 | (JP) | 2001-191236 |
| Jul. 2, 2001 | (JP) | 2001-200353 |
| Jul. 2, 2001 | (JP) | 2001-200354 |
| Jul. 10, 2001 | (JP) | 2001-209440 |
| Jul. 27, 2001 | (JP) | 2001-226949 |
| Jul. 27, 2001 | (JP) | 2001-227159 |
| Sep. 14, 2001 | (JP) | 2001-280277 |

(51) Int. Cl.⁷ .......................................... G11B 23/04
(52) U.S. Cl. ................... 242/338.1; 242/348; 360/132
(58) Field of Search .............................. 242/343, 338.1, 242/348, 348.2; 360/132

(56) References Cited

U.S. PATENT DOCUMENTS

| 6,462,905 B1 * | 10/2002 | Takahashi et al. | 360/132 |
| 6,563,671 B2 * | 5/2003 | Morita et al. | 360/132 |
| 6,581,866 B2 * | 6/2003 | Tsuyuki et al. | 242/348 |
| 6,680,818 B1 * | 1/2004 | Morita et al. | 360/132 |
| 2002/0181152 A1 * | 12/2002 | Tsuyuki et al. | 360/132 |

FOREIGN PATENT DOCUMENTS

WO    WO 01/04902 A1    1/2001

* cited by examiner

Primary Examiner—John Q. Nguyen
(74) Attorney, Agent, or Firm—Sughrue Mion, PLLC

(57) ABSTRACT

The object of the invention is to provide a magnetic tape cartridge, in which a release pad can be assembled securely by a robot. A magnetic tape cartridge including: a reel around which a magnetic tape is wound; a cartridge case which houses the reel in a locked position; a release pad for releasing locking of the reel; and a cup-like hub of the reel in which the release pad is mounted, wherein a plurality of guide holes for allowing a plurality of lock release pins to penetrate therein, which extend from the lower surface of the release pad, are made in the periphery of a base plate of the cup-like hub, and a plurality of pairs of guide ribs, which are capable of guiding the plurality of lock release pins to the plurality of guide holes, stand inside the cup-like hub corresponding to the plurality of guide holes.

4 Claims, 23 Drawing Sheets

MAGNETIC TAPE CARTRIDGE

This is a divisional of application Ser. No. 10/173,867 filed Jun. 19, 2002, now U.S. Pat. No. 6,851,169; the disclosure of which is incorporated herein by reference.

FIELD OF THE INVENTION

The present invention relates to a magnetic tape cartridge and more particularly to technique for improving the assembly of parts inside the magnetic tape cartridge.

BACKGROUND OF THE INVENTION

As a magnetic tape cartridge used for an external storage medium of data backup for computers, the magnetic tape cartridge of LTO (Linear Tape Open) standard has been known hitherto. The magnetic tape cartridge of this type has a case composed of the upper and lower half sections, in which a single reel wound with a magnetic tape is housed. The cartridge case possesses an opening for extracting the tape with a leader pin, and another opening for driving the reel, through which the cup-like hub of the reel is exposed, is made on the lower half section of the cartridge case.

A drive unit, into which the magnetic tape cartridge of this type is loaded, extracts the leader pin to wind out the magnetic tape through the opening of the cartridge case and performs recording or playback of the data. It also rewinds the magnetic tape around the reel by driving the cup-like hub through the opening of the lower half section and performs recording or playback of the data. The magnetic tape cartridge has a lock mechanism including a lock plate and a release pad in the small space in the cup-like hub of the reel. The lock plate is capable of locking the reel in order that the reel rotates only when it is loaded in the drive unit and does not rotate inadvertently when it is extracted from the drive unit, and also the slack of the magnetic tape while it is not in use is prevented. The release pad is able to release locking of the reel.

The lock plate is a disk-like member and has a first engaging portion capable of engaging or disengaging with a second engaging portion standing on the periphery of the inner surface (upper surface) of the base plate of the cup-like hub of the reel. Also it has a third engaging portion, which continuously engages with a fourth engaging portion projecting from the middle of the inner surface of the upper half section of the cartridge case. The lock plate will retain the reel lock position by engaging the first engaging portion with the second engaging portion by the force imposed by a compression coil spring provided between the lock plate and the upper half section.

The reel, on which the lock mechanism is mounted, will be described, referring to FIG. 23. It has been so arranged hitherto that an upper flange 115, which is a disk-like plate with a circular opening 115a in its center, is fixed to a flanged hub 110, which has a lower flange 112 integrally molded with a base plate 111a of a cup-like hub 111. A rib 115b to fit with the cup-like hub 111 is provided on the rim of the opening 115a of the upper flange 115 thoroughly along the inner cylindrical wall of the cup-like hub 111 in order to center the axis of the flanged hub 110 with that of the upper flange 115.

On the other hand, a release pad 120 is a plate member such as a rectangle, quadrilateral, star or propeller-like shape and disposed between the inner surface (upper surface) of the base plate 111a of the cup-like hub 111 of the reel and the lock plate (not shown). Lock releasing pins 121, which penetrate the base plate 111a of the cup-like hub 111, extend from the lower surfaces of the respective corners of the lock release pad 120 facing closely the inner surface of the cylindrical wall of the cup-like hub 111. When the magnetic tape cartridge is loaded into a drive unit and the cup-like hub 111 is rotationally driven by a reel drive mechanism (not shown) of the drive unit, each lock release pin 121 is forced to displace toward the lock plate (not shown). Accordingly the release pad 120 will press the lock plate (not shown) toward the upper half section against the force of a compression coil spring, thereby releasing the locked reel by disengaging the first engaging portion under the lock plate.

Since the rib 115b is provided around the periphery of the upper flange 115 which is melt-bonded to the opening of the cup-like hub 111 of the reel, the rib 115b overhangs the inner surface of the cylindrical wall of the cup-like hub 111. So, when the release pad 120 is mounted inside the cup-like hub 111 of the reel during the assembly of the magnetic tape cartridge, the release pad 120 is inserted slantwise into the cup-like hub 111 in order to avoid the interference with the inner circumference (the rib 115b) of the upper flange 115, and each lock release pin 121 of the release pad 120 is aligned with and inserted into each guide hole 122.

Each guide hole 122, which is made at the base plate of the cup-like hub 111, is positioned near the inner surface of the cylindrical wall of the cup-like hub 111 in accordance with the circumference of a circle required by LTO standard. Therefore, it is difficult to align each lock release pin 121 of the release pad 120, which is inserted slantwise into the cup-like hub 111, with each guide hole 122 securely, which will possibly lead to a defective mounting of the release pad 120 if a robot is introduced into the assembly. In this connection, it is inherently difficult to align each lock release pin 121 of the release pad 120 with each guide hole 122 securely, even if the release pad 120 can be inserted into the cup-like hub 111 horizontally when the inner circumference of the flange does not overhang the inner surface of the cylindrical wall (without rib 115b). The defective mounting of the release pad 120 will also possibly occur if the mounting is performed by an assembly robot.

SUMMARY OF THE INVENTION

The first object of the present invention is to provide a magnetic tape cartridge, which permits the secure mounting of the release pad 120 with an assembly robot.

As shown in FIG. 23, the diameter of the opening of the cup-like hub 111 is reduced by the thickness of the rib 115b, since the rib 115b provided for the upper flange 115 is mated with the inner cylindrical wall of the cup-like hub 111. Thus, it has been difficult to mount the release pad 120, which is designed to be close to the inner cylindrical wall of the cup-like hub 111, inside the cup-like hub 111. When the release pad 120 is mounted inside the cup-like hub 111 by a man, the mounting can be performed if two of three corners of the release pad 120 are first inserted slantwise under the rib 115b. When an automated assembly such as introduction of a robot is applied to the mounting, it has caused assembly mistakes due to the inevitable complex movements.

The second object of the present invention to asses the problems is to enable an easy mounting of parts inside the cup-like hub 111 for the reel of the magnetic tape cartridge, in which the parts are mounted near the inner cylindrical wall of the cup-like hub 111. Further, the third object is to provide a method for assembling a magnetic tape cartridge, which allows an easy mounting of the parts such as the release pad 120 inside the cup-like hub 111 of the reel A process for assembling the magnetic tape cartridge has been studied, in which a robot picks up the parts from the parts table that is placed around the assembly station of the magnetic tape cartridge, and mounts them on the lower half section waiting on the assembly station. It is difficult to utilize a robot to pick up the parts unless the horizontal direction of the parts to be mounted is arranged in line with that of the lower half section.

Even if the robot picks up the parts successfully on the parts table, it is also difficult for the robot to mount the parts on the lower half section unless the horizontal direction of the parts to be mounted is arranged in line with that of the lower half section.

Though the assembly described above would possibly be performed by a man, it will not be adopted since the assembly, which requires changes in the direction of the parts, the lower half section or the reel, is a great burden to a worker.

The fourth object of the present invention to assess these problems is to provide a method for determining the relative position of a pair of parts to be assembled one on top of the other in the magnetic tape cartridge, which enables the assembly of the parts by coordinating the respective horizontal directions of the parts, when the magnetic tape cartridge is assembled.

The present invention to address the first object according to claim 1 provides a magnetic tape cartridge comprising: a reel around which a magnetic tape is wound; a cartridge case which houses the reel in a locked position; a release pad for releasing locking of the reel; and a cup-like hub of the reel in which the release pad is mounted, wherein a plurality of guide holes for allowing a plurality of lock release pins to penetrate, which extend from the lower surface of the release pad, are made in the periphery of a base plate of the cup-like hub, and a plurality of pairs of guide ribs, which are capable of guiding the plurality of lock release pins to the plurality of guide holes, stand inside the cup-like hub corresponding to the plurality of guide holes.

According to the magnetic tape cartridge of claim 1, each pair of guide ribs, which projects from the base plate inside the cup-like hub, guides each lock release pin of the release pad to each guide hole, when the release pad is mounted inside the cup-like hub by aligning each lock release pin of the release pad with each guide hole provided at the periphery of the base plate of the cup-like hub. Consequently, each lock release pin is inserted into each guide hole securely, and the release pad is thereby mounted inside the cup-like hub securely.

In the magnetic tape cartridge according to claim 1, the guide ribs normally project from the periphery of the base plate inside the cup-like hub. However, the guide ribs may project from the lower portion of the inner cylindrical wall of the cup-like hub or the portion lying across the periphery of the base plate and the lower part of the inner cylindrical wall. It would be preferable to increase the gap of each pair of guide ribs in the direction of approaching of the lock release pin so that the pair of the guide ribs may guide the lock release pin smoothly.

The present invention to address the first object according to claim 5 provides a magnetic tape cartridge comprising: a reel around which a magnetic tape is wound; a cartridge case which houses the reel in a locked position; a release pad for releasing locking of the reel; and a cup-like hub of the reel in which the release pad is mounted, the release pad comprising: a main pad which possesses a plurality of corners facing the inner surface of a cylindrical wall of the cup-like hub; and a plurality of lock release pins which extend from the lower surfaces of the corners of the main pad and penetrate a base plate of the cup-like hub, wherein the inner circumference of a flange, which is placed on the opening side of the cup-like hub, overhangs the inner surface of a cylindrical wall of the cup-like hub and a plurality of cutouts are provided on the inner circumference of the flange, which permit each corner of the release pad to pass in an approximately horizontal position in the axial direction of the reel.

According to the magnetic tape cartridge of claim 5, the release pad is held in an approximately horizontal mounting position over the cup-like hub and each corner of the pad is aligned with each cutout of the upper flange, when the release pad is mounted inside the cup-like hub of the reel. Subsequently, the release pad is lowered with the lock release pins downward into the cup-like hub in the reel axial direction while the release pad is kept in an approximately horizontal mounting position. The release pad is inserted into the cup-like hub by allowing each corner of the pad to pass each cutout. Then the release pad is mounted inside the cup-like hub securely by inserting each lock release pin into each guide hole made at the periphery of the base plate of the cup-like hub. Therefore, the magnetic tape cartridge according to claim 5 enables a secure mounting of the release pad by an assembly robot, since the release pad can be brought into the cup-like hub without tilting in an approximately horizontal mounting position.

In the magnetic tape cartridge according to claim 5, if each cutout of the upper flange is positioned so that it is over each guide hole, the mounting of the release pad will be much easier, since each lock release pin can be inserted into each guide hole just by dropping the release pad which is brought into the cup-like hub in an approximately horizontal position.

The magnetic tape cartridge according to claim 5 achieves the first object of the invention. That is—when the release pad is mounted inside the cup-like hub of the reel, the release pad is kept over the cup-like hub in an approximately horizontal mounting position and each corner of the pad itself is aligned with each cutout of the upper flange. Subsequently, the release pad in an approximately horizontal position is lowered with the lock release pins downward into the cup-like hub in the reel axial direction. And each corner of the release pad passes each cutout, thereby bringing the release pad into the cup-like hub. Each lock release pin is aligned with and inserted into each guide hole made at the periphery of the base plate of the cup-like hub, so that the release pad is mounted inside the cup-like hub securely. Therefore, the magnetic tape cartridge according to the invention enables a secure mounting of the release pad by an assembly robot, since the release pad can be brought into the cup-like hub in an approximately horizontal mounting position, different from the prior art which requires tilting of the release pad.

The present invention to address the second object according to claim 7 provides a magnetic tape cartridge comprising: a cup-like hub; and a reel in which parts of the magnetic tape cartridge are mounted near the inner surface of a cylindrical wall of the cup-like hub, wherein the reel comprises: an upper flanged hub in which an upper flange is integrally molded with the end of an opening of the cup-like hub; and a lower flange which is fixed to a base plate of the cup-like hub.

The reel of the magnetic tape cartridge according to claim 7 will not require the decrease in the diameter of the opening, since the upper flange is integrally molded with the end of the opening of the cup-like hub. Therefore, when the parts such as the lock mechanism are mounted in the cup-like hub, they will be easily done without complex operations such as inserting a part tilted into the cup-like hub.

The present invention to address the second object according to claim 8 provides a magnetic tape cartridge comprising: a cup-like hub; and a reel in which parts of the magnetic tape cartridge are mounted near the inner surface of a cylindrical wall of the cup-like hub, wherein the reel comprises: a lower flanged hub in which a lower flange of a disk-like plate is integrally molded with the outer circumference of a base plate of the cup-like hub; and an upper flange of a disk-like plate which is fixed on the end of an opening of the cup-like hub, wherein a fitting rib for centering the upper flange with the lower flanged hub projects from the upper flange around the inner circumference, and the inner diameter of the end of the opening of the cup-like hub is increased by reducing the thickness of the wall of the cup-like hub in order to provide a fitting portion with which the fitting rib is mated.

The magnetic tape cartridge according to claim 8 permits the fitting rib for centering, which projects from the upper flange, to mate with the cup-like hub, since the diameter of the opening of the cup-like hub of the reel is increased by thinning the wall of the opening end. Therefore, the assembly can be easily performed for the parts to be mounted close to the inner circumference of the cup-like hub.

The magnetic tape cartridge according to claims 7 and 8 achieves the second object of the invention and enables an easy assembly of the parts inside the cup-like hub of the reel.

The present invention to address the third issue according to claim 9 provides a method for assembling a magnetic tape cartridge, the magnetic tape cartridge comprising: a reel wound with a magnetic tape and housed in a cartridge case including a lower flanged hub in which a lower flange of a disk-like plate is integrally molded with the outer circumference of a base plate of a cup-like hub; an upper flange of a disk-like plate which is fixed to the end of an opening of the cup-like hub; a fitting rib which projects from the upper flange around the inner circumference for centering the upper flange with the lower flanged hub; and a plurality of parts of the magnetic tape cartridge, which are mounted near the inner surface of a cylindrical wall of the cup-like hub, the method comprising the steps of mounting the parts in the cup-like hub of the lower flanged hub; and fixing the upper flange on the end of the opening of the cup-like hub.

The method for assembling the magnetic tape cartridge according to claim 9 enables the assembly, in which the upper flange is fixed to the end of the opening of the cup-like hub by aligning with the hub by means of the fitting rib after the parts of the magnetic tape cartridge are mounted near the inner surface of the cylindrical wall of the cup-like hub. Therefore, the fitting rib of the upper flange will not cause any interference with mounting of the parts.

The assembly method of the magnetic tape cartridge according to claim 9 achieves the third object: the fitting rib of the upper flange does not interfere with mounting of the parts, thus allowing an easier mounting, since the upper flange is fixed after the parts are mounted near the inner surface of the cylindrical wall of the cup-like hub.

The present invention to address the fourth object according to claim 11 provides a method for determining a relative position of a part of a magnetic tape cartridge comprising at least a pair of parts which is mated one on top of the other, the method comprising the steps of: detecting a first horizontal direction of a first part relative to a second horizontal direction of a second part; and coordinating the directions of the parts by rotating one of the parts based on the detected values.

The method of relative positioning of the mounting parts of a magnetic tape cartridge according to claim 11 gives an easier mounting of parts, since the horizontal directions of the parts to be mated one on top of the other are aligned in advance.

A method of determining a relative direction of the mounting parts of the magnetic tape cartridge according to claim 11 accomplishes the fourth object. It will permit an easier mating of the parts for the magnetic tape cartridge since the horizontal directions of a pair of the parts to be mated one on top of the other are coordinated in advance and the mating is performed subsequently. It will prevent the work delay caused by the defective mating, thereby improving the productivity.

DESCRIPTION OF THE PREFERRED EMBODIMENTS

The preferred embodiments of the present invention will now be described with reference to the accompanying drawings.

Figure 1:
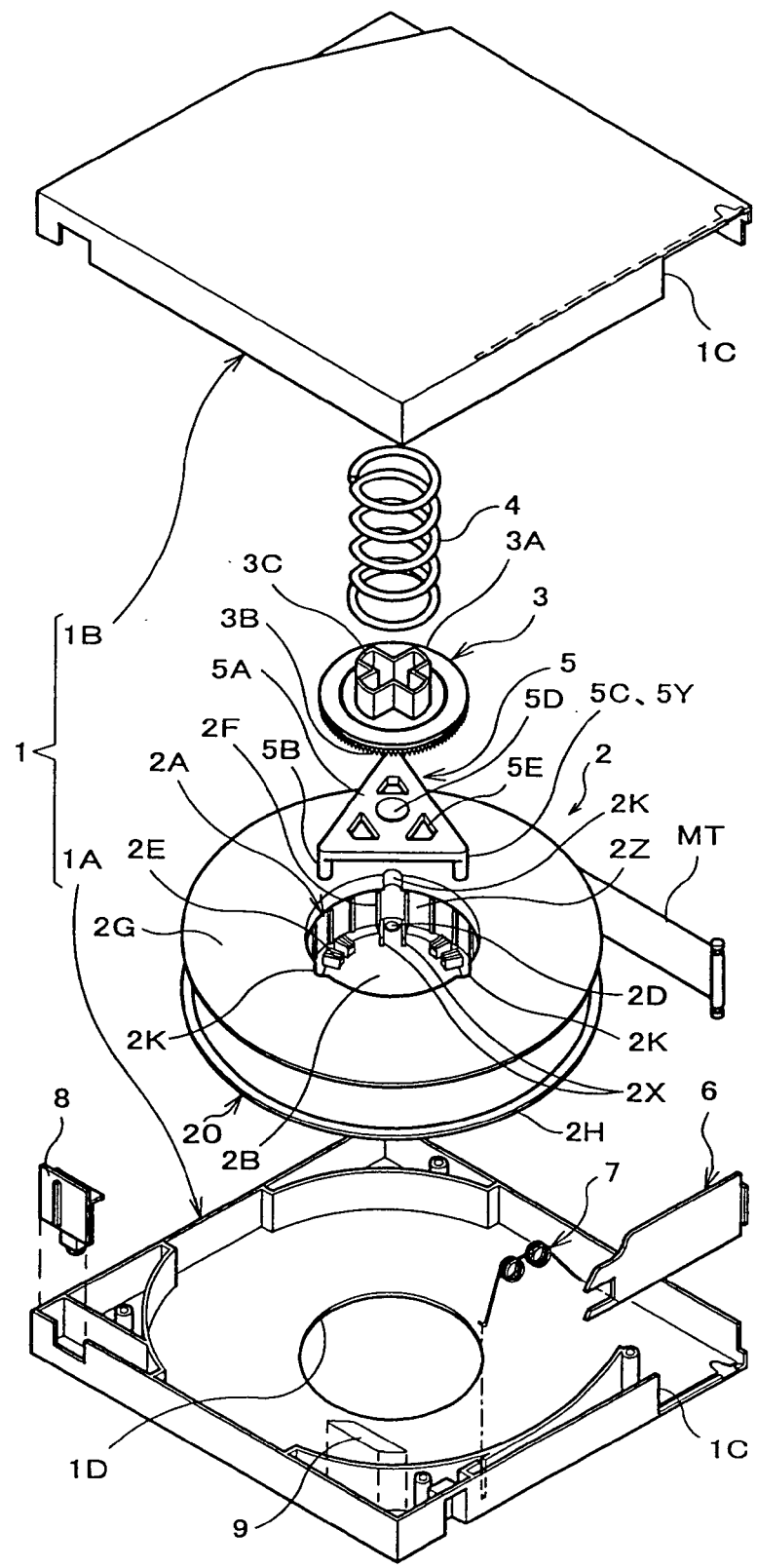
FIG. 1 is an exploded perspective view showing the structure of a magnetic tape cartridge.

The structure of a magnetic tape cartridge is described referring to FIG. 1 before starting the description of individual embodiments.

As shown in FIG. 1 a magnetic tape cartridge, which is in conformity to the LTO standard. Inside a cartridge case 1 including a lower half section IA and an upper half section 1B, are housed a single reel 2 around which a magnetic tape MT is wound, a lock plate 3 for locking the rotation of the reel 2, a compression coil spring 4, a release pad 5 for releasing locking of the reel 2, a sliding door 6 for opening or closing a magnetic tape extracting opening 1C lying across the lower half section 1A and the upper half section 1B of the cartridge case 1, a torsion coil 7 pressing the sliding door 6 in the closing direction, an inadvertent erasing protection claw 8 and a cartridge memory 9.

The reel 2 has a cup-like hub 2A with an opening toward the upper half section 1B in the center. The release pad 5, the lock plate 3 and the compression coil spring 4 are sequentially mounted inside the cup-like hub 2A. The outer surface (lower surface) of a base plate 2B of the cup-like hub 2A is exposed outside the cartridge case 1 through a circular opening 1D made in the center of the lower half section 1A. A face gear 2C (see FIG. 10) is provided around the periphery of the outer surface of the base plate 2B. The face gear 2C engages with another face gear of the reel drive mechanism of a drive unit (not shown), into which the magnetic tape cartridge is loaded, and rotates the reel 2. A metal plate 2W (see FIG. 10) which is attracted by the magnet of the reel drive mechanism of the drive unit (not shown) is inserted inside the face gear 2C of the outer surface of the base plate 2B.

As shown in FIG. 1, a lower flange 2H of a disk-like plate extends radially from the outer rim of the base plate 2B of the cup-like-hub 2A and is integrally molded to form a flanged hub 20.

Figure 3:
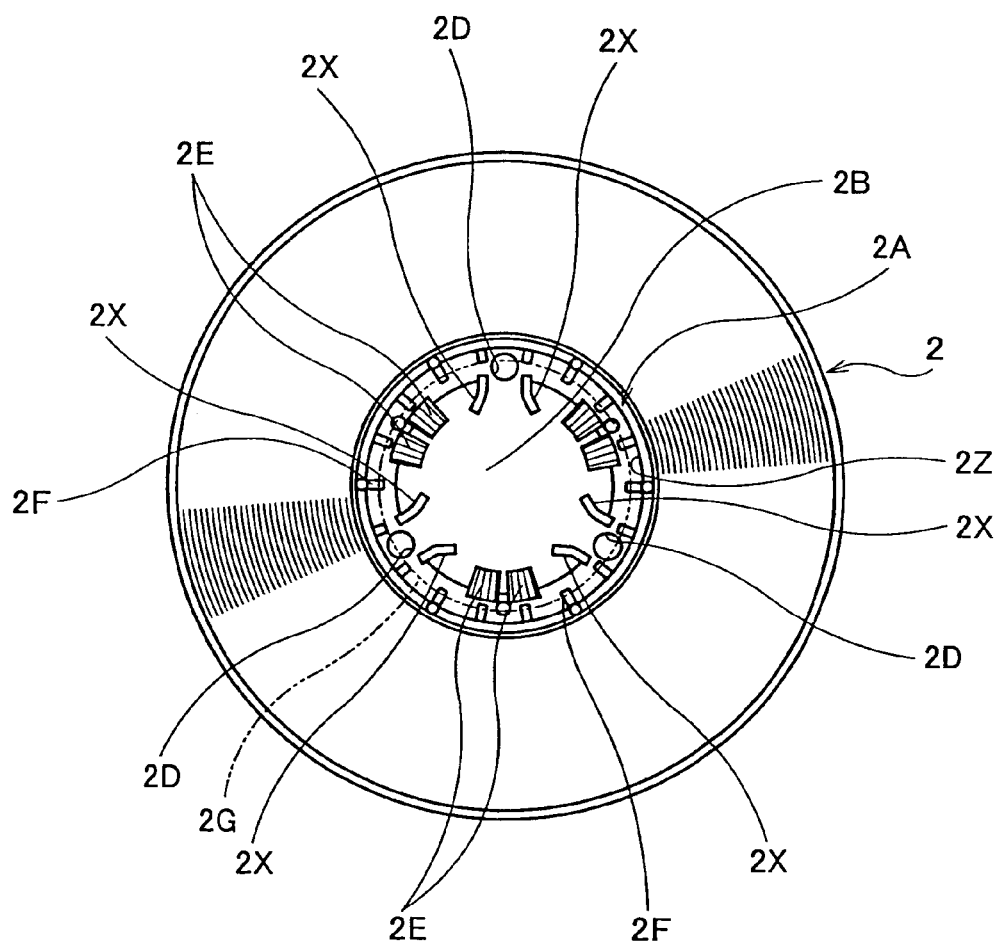
FIG. 3 is a top view showing the structure of the inside of the cup-like hub according to the first embodiment.
Figure 4:
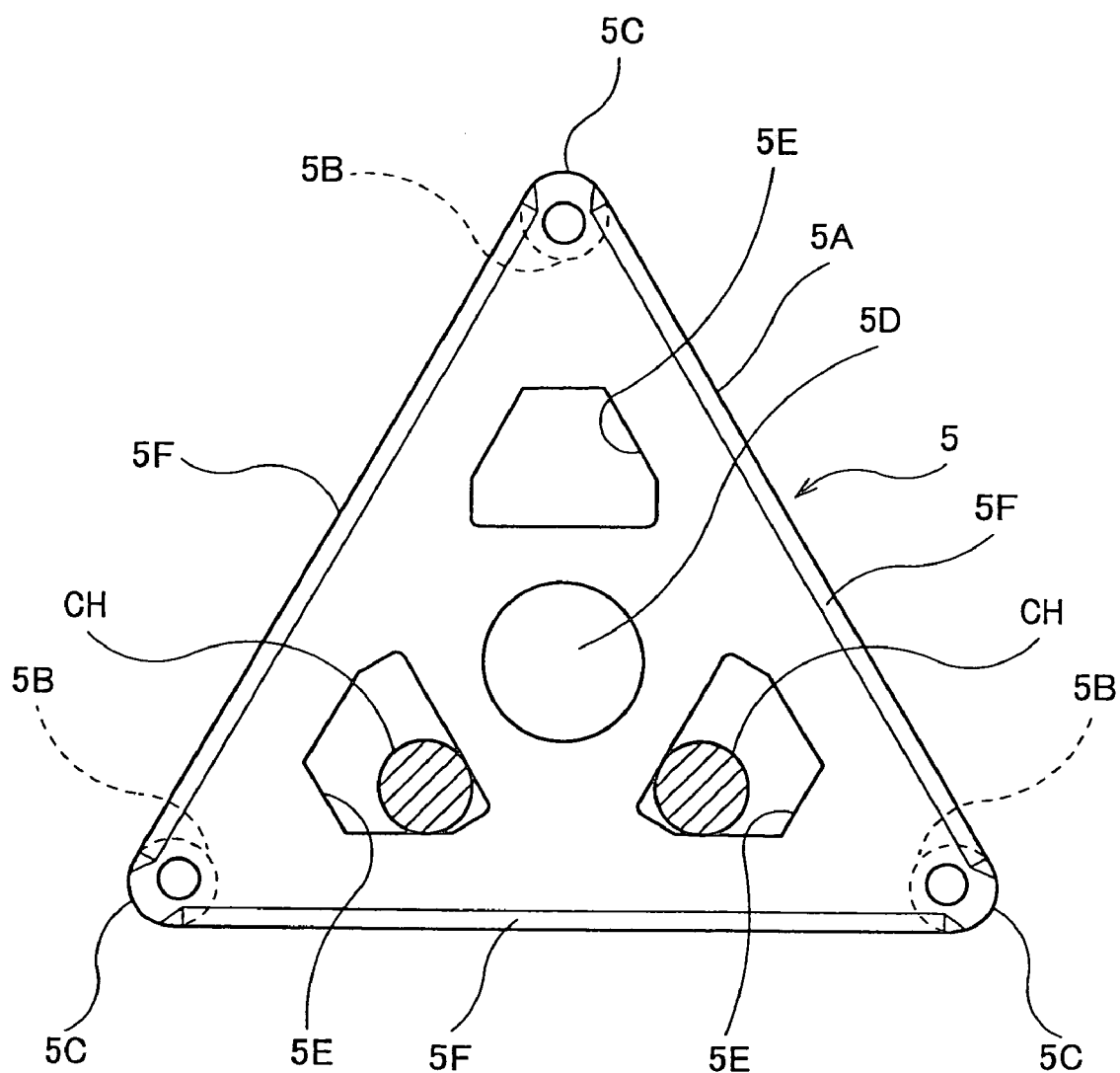
FIG. 4 is a top view showing the holding of the release pad during its mounting according to the first embodiment.

Three guide holes 2D (only one is shown in FIG. 1), which guide lock release pins 5B extending from the lower surface of a main pad 5A of the release pad 5, are provided around the periphery of the base plate 2B of the cup-like hub 2A of the reel 2 (see FIG. 3). These guide holes 2D are laid out around the circumference of a circle with the radius specified by the LTO standard at the equal intervals near the inner surface of a cylindrical wall 2Z of the cup-like hub 2A, and made within the width of the gear tooth. An engagement member stands in between the neighboring two of the three guide holes 2D, three locations (only two locations shown in FIG. 1) on the periphery of the inner surface (upper surface) of the base plate 2B of the cup-like hub 2A (see FIG. 3). An engagement plane 2E of sawtooth with a cross section of triangle, which has a radial tooth trace, is formed on the top of each engagement member. A plurality of reinforcing ribs 2F are provided on the inner surface of the cylindrical wall 2Z of the cup-like hub 2A vertically, avoiding the interference with the guide holes 2D.

As shown in FIG. 1, the lock plate 3 has a disk-like main plate 3A, which can be housed in the cup-like hub 2A of the reel 2. On the periphery of the lower surface of the main plate 3A an engagement plane 3B of sawtooth with a cross section of triangle is formed, which has a radial tooth trace and can be engaged or disengaged with the engagement plane 2E in the cup-like hub 2A. In the middle of the upper plane of the main plate 3A is placed an engagement tube 3C with a cross-like section, into which an engagement projection (not is shown) standing in the middle of the inner plane of the upper half section 1B is inserted. And the lock plate 3 is pressed by the compression coil spring 4 which is installed around the engagement tube 3C and interposed between the upper half section 1B and the lock plate 3, thereby engaging the engagement plane 3B of sawtooth with a cross section of triangle with the engagement plane 2E on the base plate 2B of the cup-like hub 2A detachably.

The release pad 5 includes the main pad 5A, which is of an approximately equilateral triangle plate with corners 5Y shaped like an arc and interposed between the inner (upper) surface of the base plate 2B of the cup-like hub 2A and the lock plate 3. Three cylindrical lock release pins 5B (only two are shown in FIG. 1), which are guided by the three guide holes 2D respectively (only one shown in FIG. 1) that are made on the base plate 2B of the cup-like hub 2A, extend continuously from arc-like side surfaces 5C on the lower surfaces of the respective corners 5Y. In the middle of the main pad 5A is formed a spherical projection 5D, which makes point contact with another spherical projection (not shown) formed in the middle of the lower surface of the main plate 3A of the lock plate 3. Three chuck guide holes 5E are provided on the main pad 5A, lying in between the spherical projection 5D and each corner 5Y.

[First Embodiment (Corresponding to Claim 1)]

The first embodiment according to the present invention win now be described referring to FIGS. 1–6.

Figure 2:
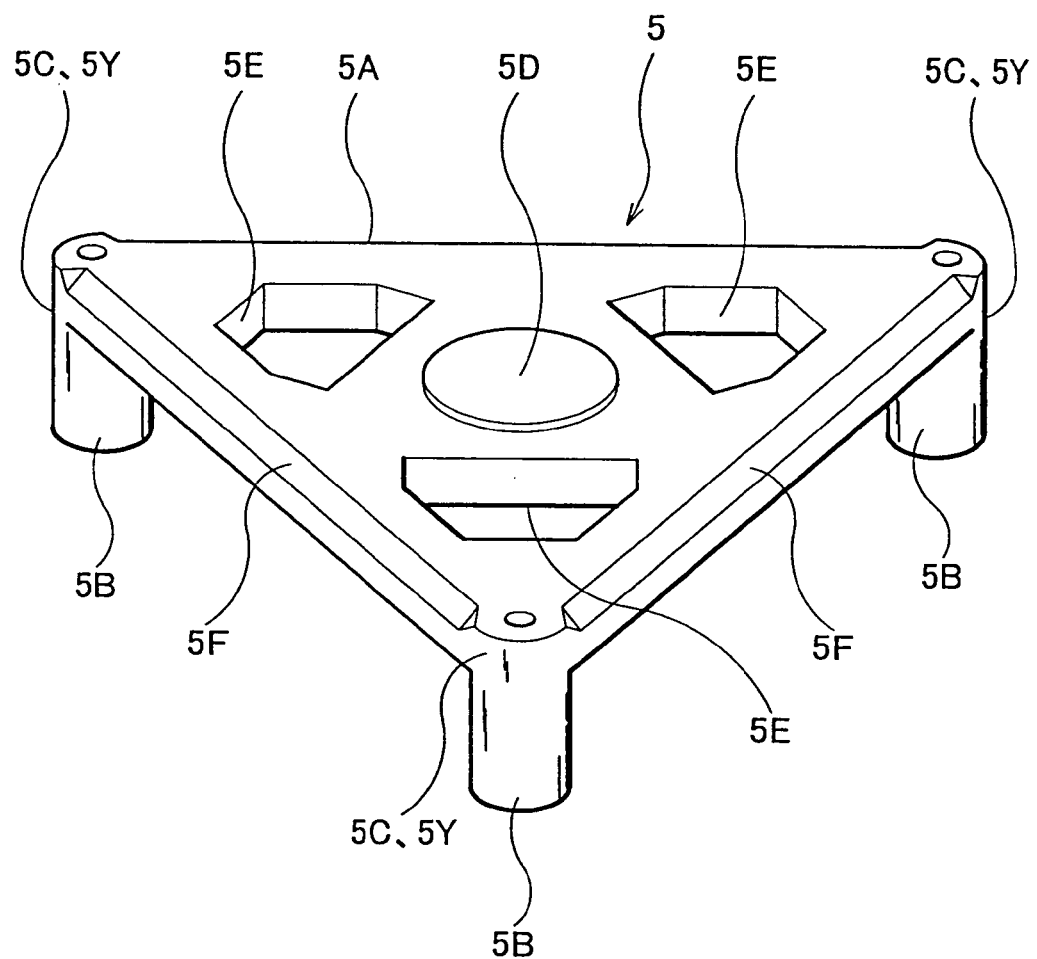
FIG. 2 is a perspective view of the release pad according to the first embodiment.

As shown enlarged in FIG. 2, three chuck guide holes 5E are provided on the main pad 5A of the release pad 5, lying in between the spherical projection 5D and each corner 5Y. On each upper edge of the main pad 6A is provided a chamfered surface 5F, which allows a clearance between the main pad 5A and each reinforcing rib 2F projecting from the inner cylindrical wall 2Z of the cup-like hub 2A shown in FIG. 1. An appropriate angle is selected, for example, within the range of 30 to 60 deg. for the angle of the chamfered surface 5F.

In the reel 2 shown in FIG. 1, the inner circumference of an upper flange 2G, which is melt-bonded to the opening side of the cup-like hub 2A, overhangs the inner surface of the cylindrical wall 2Z of the cup-like hub 2A, facing the guide holes 2D as shown by the two-dot chain line in FIG. 3. In order to make mounting of the release pad 5 (see FIG. 2) inside the cup-like hub 2A easier, guide ribs 2X, which are capable of guiding the lock release pins 5B towards the guide holes 2D, are prepared for the respective guide holes 2D.

As shown enlarged in FIG. 3, a pair of guide ribs 2X project from the base plate 2B, disposed at both sides of each guide hole 2D in the circumferential direction of the cylindrical wall 2Z of the cup-like hub 2A. Each pair of guide ribs 2X is so arranged that the gap between them increases as it comes closer to the center of the base plate 2B in order that each pair of guide ribs 2X may guide each lock release pin 5B smoothly. The height of each pair of guide ribs 2X is set lower than that of each engagement plane 2E so that each pair of guide ribs 2X may not interfere with the engagement plane 3B of the lower surface of the lock plate 3.

Figure 5:
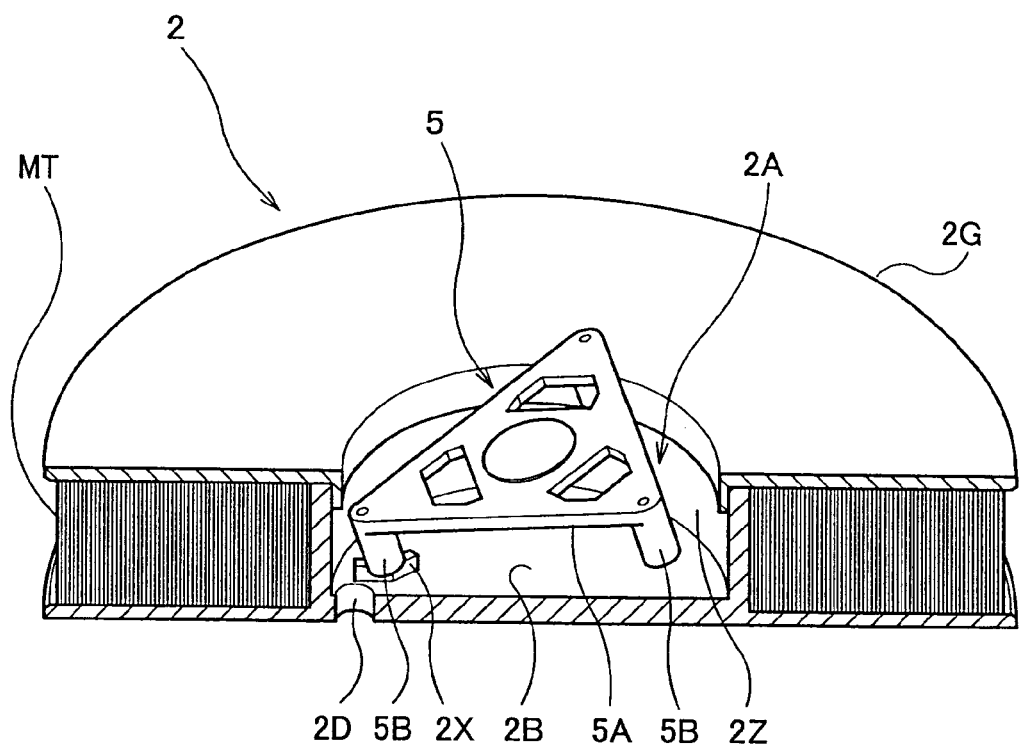
FIG. 5 is a perspective view illustrating the mounting of the release pad on the cup-like hub of the reel according to the first embodiment.
Figure 6:
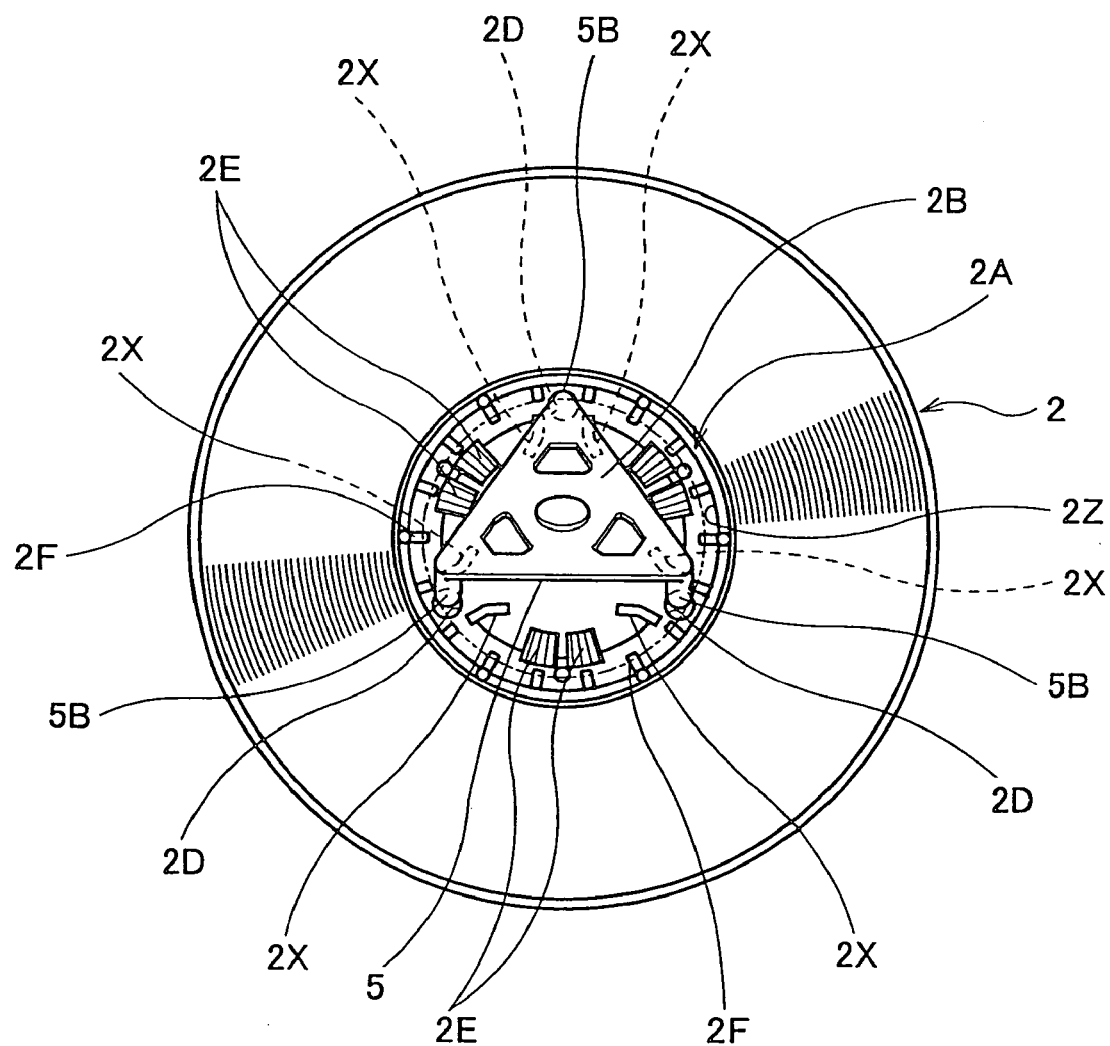
FIG. 6 is a top view illustrating the mounting of the release pad on the cup-like hub of the reel according to the first embodiment.
Figure 7:
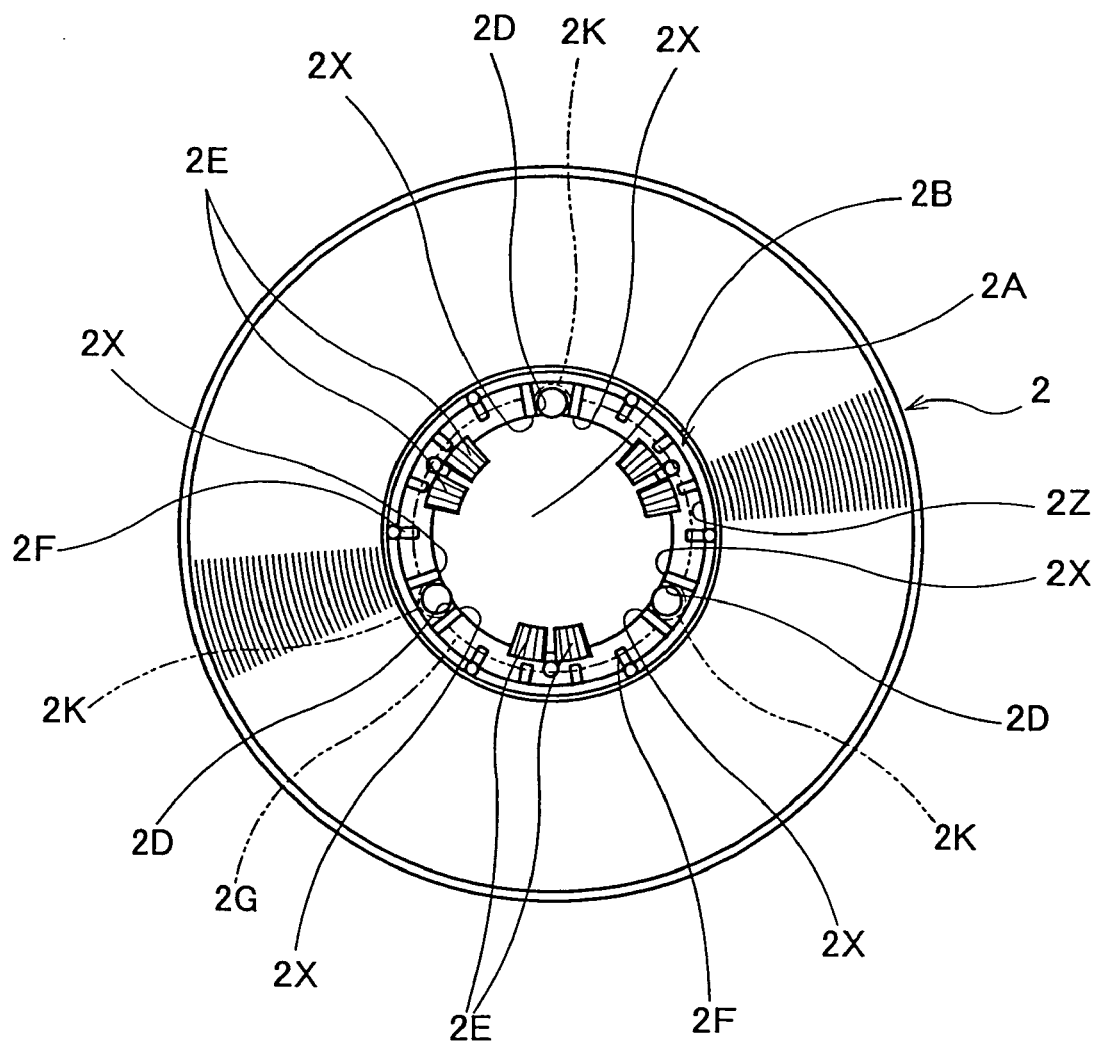
FIG. 7 is a top view showing the structure of the inside of the cup-like hub according to the second embodiment.

In the assembly of the magnetic tape cartridge according to the first embodiment, the release pad 5 is mounted inside the cup-like hub 2A of the reel 2 by an assembly robot (not shown). The assembly robot inserts a pair of chucks CH into two of three chuck guide holes 5E from above and holds the main pad 5A, with the releasing pin 5B which is positioned near the remaining third chuck guide hole 5E as a head (see FIG. 4). And the assembly robot inserts the release pad 5 into the cup-like hub 2A, allowing the release pad 5 to pass the inner circumference of the upper flange 2G of the reel 2 with the head lock release pin 5B tilted downward as shown in FIG. 5.

The assembly robot lowers the rear of the main pad 5A to decrease the tilt of the release pad 5, moving the head lock release pin 5B close to one of the three guide holes 2D on the base plate 2B of the cup-like hub 2A. And the assembly robot adjusts the position of the head lock release pin 5B to this guide hole 2D (see FIG. 6). The pair of the guide ribs 2X projecting from the base plate 2B, which is placed at both sides of the guide hole 2D, will guide the head lock release pin 5b to the guide hole 2D. Therefore, the position of the head lock release pin 5B is adjusted to the corresponding guide hole 2D securely.

Subsequently, the robot opens the chuck CH to release holding of the main pad 5A, dropping the release pad 5 on the base plate 2B inside the cup-like hub 2A. Two pairs of guide ribs 2X (see FIG. 3), which are placed at the both sides of the remaining two guide holes 2D, guide two lock release pins 5B extending from the rear of the main pad 5A to the corresponding two guide holes 2D respectively. Consequently, the three of the lock release pins 5B of the release pad 5 are inserted into the respective guide holes 2D, thereby mounted inside the cup-like hub 2A securely.

Though the guide ribs 2X project from the base plate 2B of the cup-like hub 2A in the magnetic tape cartridge according to the first embodiment, the guide ribs 2X according to the present invention may instead project from the inner surface of the cylindrical wall 2Z of the cup-like hub 2A or from both the base plate 2B and the inner surface of the cylindrical wall 2Z.

In the description of the magnetic tape cartridge according to the first embodiment, it is assumed that the inner circumference of the upper flange 2G, which is melt-bonded to the opening side of the cup-like hub 2A, overhangs the inner surface of the cylindrical wall 2Z of the cup-like hub 2A. Though, the description is applied not only to the tape cartridge of this type but also to another tape cartridge, in which the inner circumference doesn't overhang the opening of the cup-like hub 2A. In the latter magnetic tape cartridge, it is possible to bring the release pad 5 into the cup-like hub 2A in an approximately horizontal configuration. Each pair of guide ribs 2X is also capable of guiding each lock release pin 5B of the release pad 5, which approaches from above to each guide hole 2D made at the periphery of the base plate 2B of the cup-like hub 2A, adjusting to each guide hole 2D. As a result, each lock release pin 5B of the release pad 5 is inserted into each guide hole 2D and the release pad 5 is thereby mounted inside the cup-like hub 2A securely.

The magnetic tape cartridge according to claim 1 accomplishes the first object of the present invention, enabling secure assembly of the release pad with an assembly robot.

[Second Embodiment (Corresponding to Claim 5)]

The second embodiment of the present invention will be described referring to FIG. 1 and FIGS. 7–11.

As shown in FIG. 1, the upper flange 2G is melt-bonded to the opening side of the cup-like hub 2A of the reel 2. Since the inner circumference of the upper flange 2G is mated with the inner cylindrical wall 2Z of the cup-like hub 2A with spigot joint (see FIG. 10), the inner circumference of the upper flange 2G overhangs the inner surface of the cylindrical wall 2Z of the cup-like hub 2A, facing the guide holes 2D as shown by the two-dot chain line in FIG. 7. Each pair of guide ribs 2X, which is capable of guiding each guide pin 5B of the release pad 5 downward to each guide hole 2D, projects from both sides of each guide hole 2D on the base plate 2B of the cup-like hub 2A.

The height of each pair of guide ribs 2X is set lower than that of each engagement plane 2E of sawtooth with a cross section of triangle so that each pair of guide ribs 2X may not interfere with the engagement plane 3B of sawtooth with a cross section of triangle (see FIG. 1) of the lower surface of the lock plate 3 to be described later.

The outer (lower) surface of the base plate 2B of the cup-like hub 2A is exposed outside the cartridge case 1 through the circular opening 1D made in the center of the lower half section 1A. The face gear 2C (see FIG. 10) is provided around the periphery of the outer (lower) surface of the base plate 2B. The guide holes 2D are made within the width of the gear tooth of the face gear 2C. The metal plate 2W is inserted inside the face gear 2C. The face gear 2C engages with another face gear of the reel drive mechanism of a drive unit (not shown), into which the magnetic tape cartridge according to the second embodiment is loaded. The metal plate 2W is attracted by the magnet of the reel drive mechanism of the drive unit. On that occasion, the lock release pins 5B of the release pad 5, which penetrate the guide holes 2D, are pushed back toward the lock plate 3. The lock plate 3 is pressed toward the upper half section 1B resisting the compression coil spring 4, and thereby locking of the reel 2 is released. Then, the reel 2 is rotationally driven by the reel drive mechanism of the drive unit.

Figure 8:
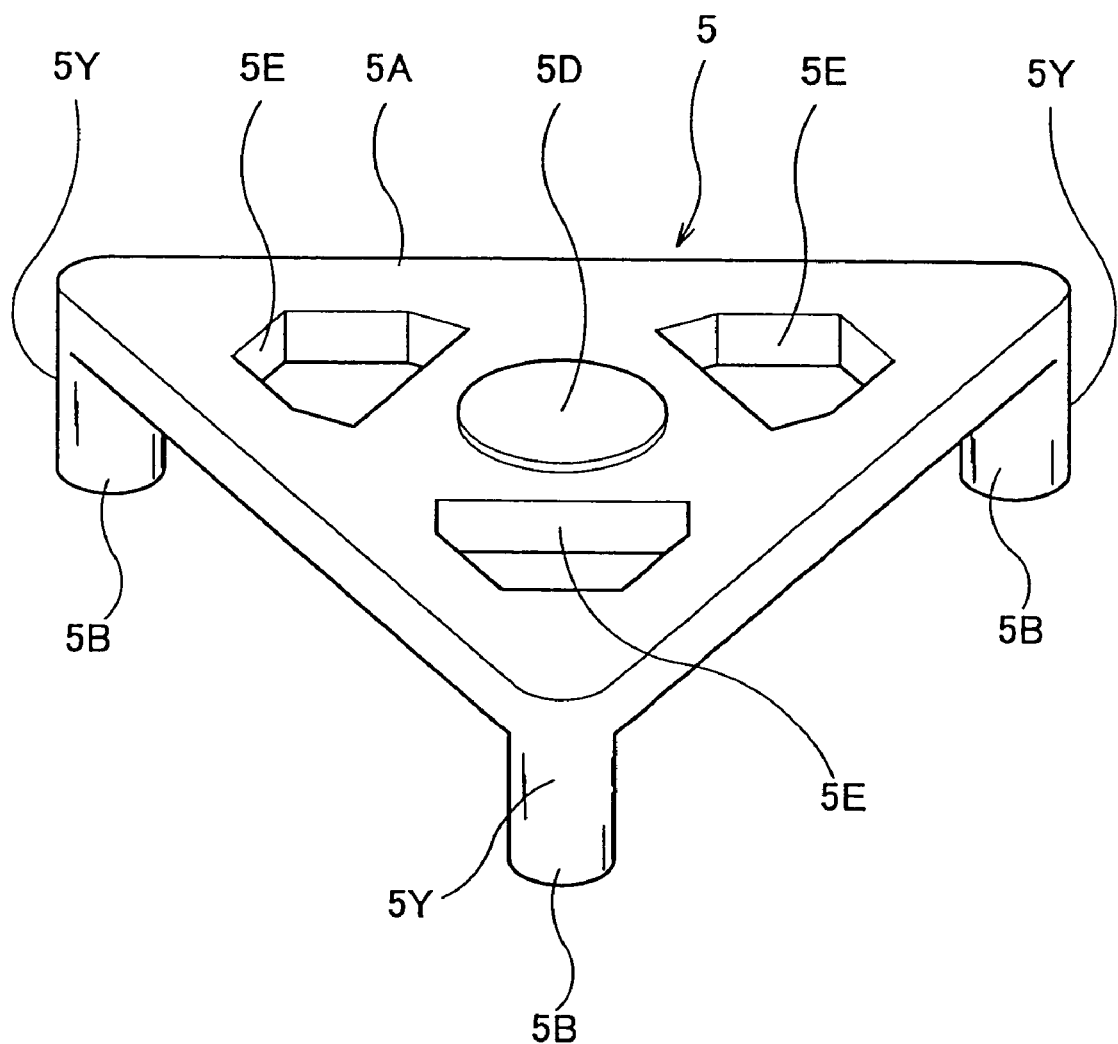
FIG. 8 is a perspective view of the release pad according to the second embodiment.
Figure 9:
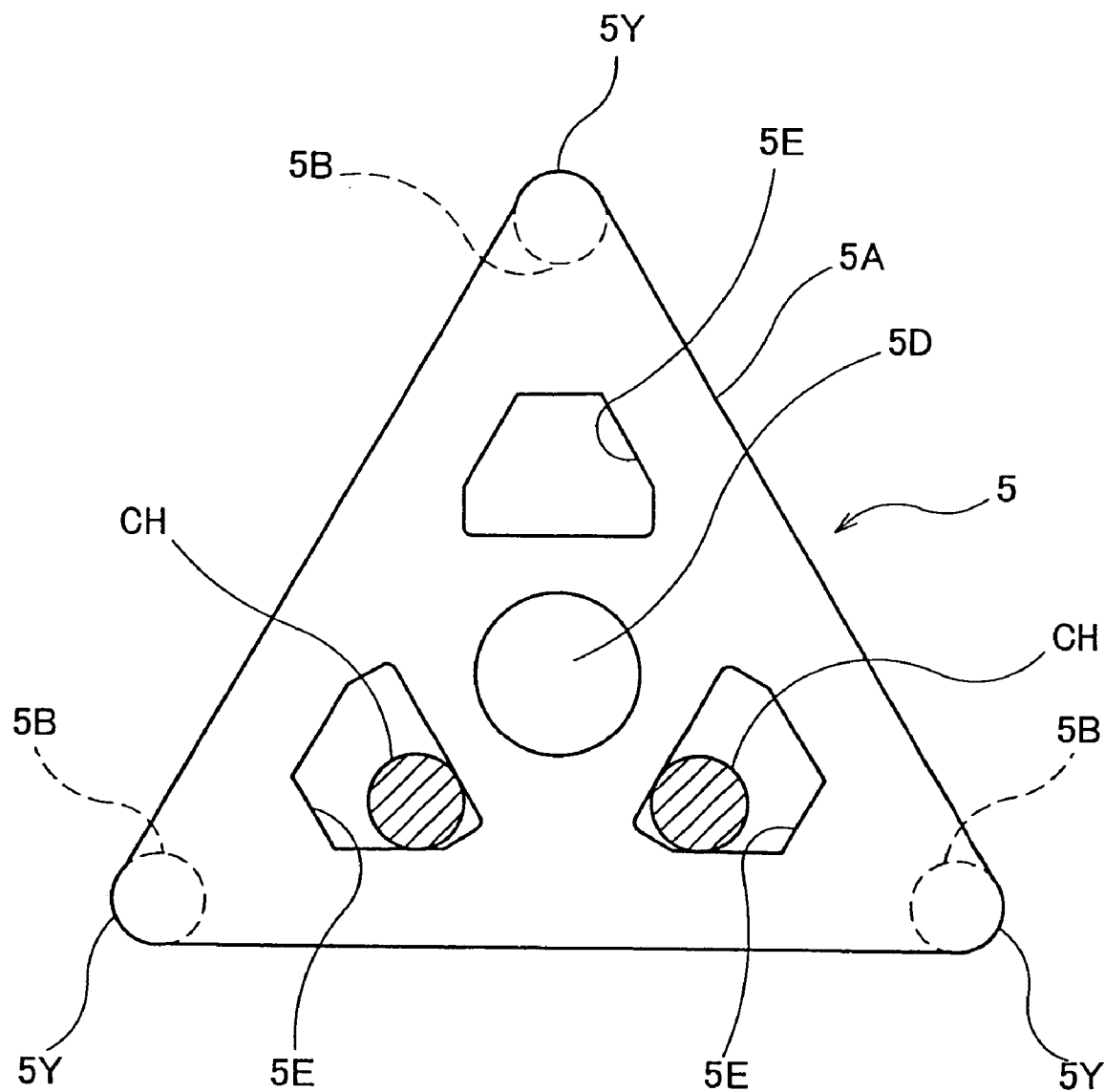
FIG. 9 is a top view showing the holding of the release pad during its mounting according to the second embodiment.

The release pad 5 includes the main pad 5A which is interposed between the inner (upper) surface of the base plate 2B of the cup-like hub 2A and the lock plate 3, and the three lock release pins 5B which are inserted into the three guide holes 2D (see FIG. 7) made on the base plate 2B. As shown in FIGS. 8 and 9, the main pad 5A is of an approximately equilateral triangle plate, each corner 5Y of which is shaped like an arc. Each lock release pin 5B is integrated with each corner 5Y of the main pad 5A, extending continuously from each corner 5Y in a cylindrical shape. In the middle of the main pad 5A is formed the spherical projection 5D, which makes point contact with another spherical projection (not shown) formed in the middle of the lower surface of the main plate 3A of the lock plate 3 (see FIG. 1). Further, three chuck guide holes 5E are provided on the main pad 5A, lying in between the spherical projection 5D and the respective corners 5Y.

Figure 10:
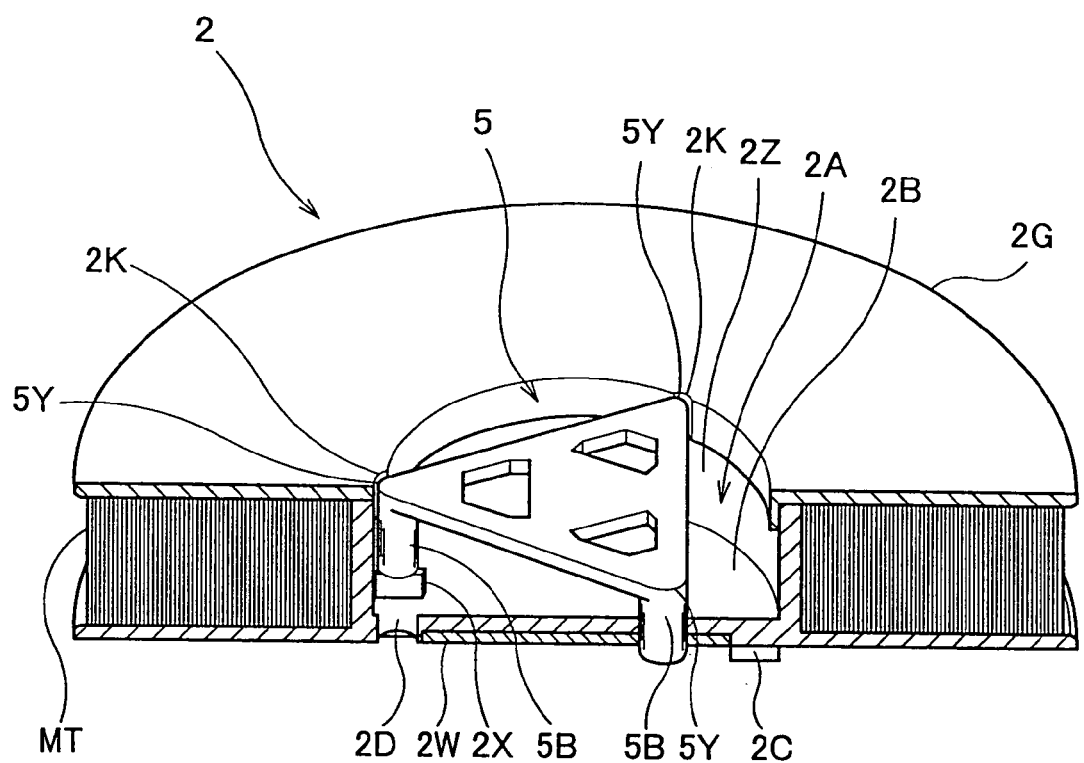
FIG. 10 is a perspective view illustrating the mounting of the release pad on the cup-like hub of the reel according to the second embodiment.
Figure 11:
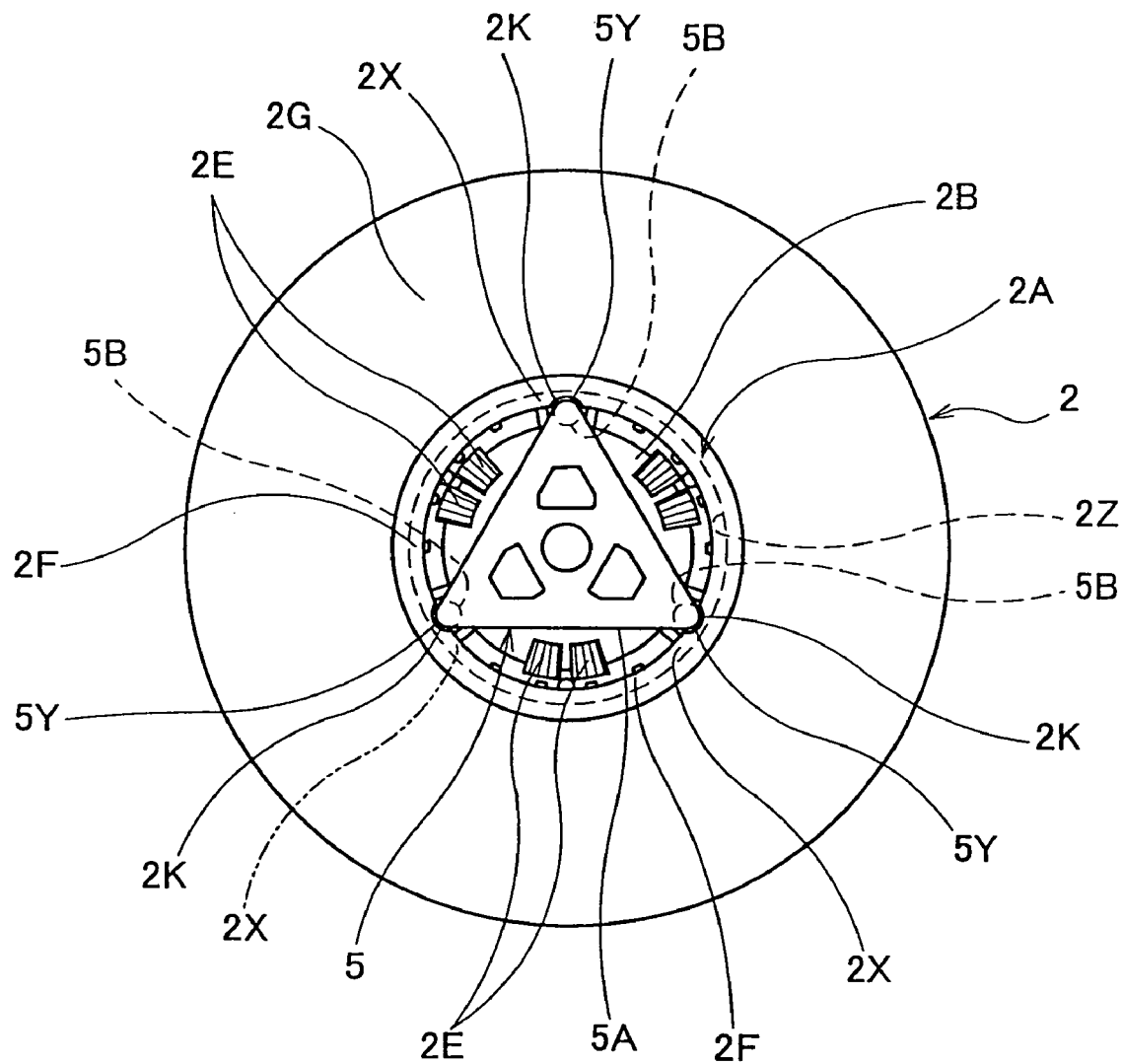
FIG. 11 is a top view illustrating the mounting of the release pad on the cup-like hub of the reel according to the second embodiment.

As shown in FIGS. 10 and 11, on the inner circumference of the upper flange 2G of the reel 2 is formed three cutouts 2K, which enable the corners 5Y of the main pad 5 to pass in the axial direction of the reel 2 while the release pad 5 is held horizontally. Specifically, on the inner circumference of the upper flange 2G are formed three cutouts 2K, which enable the corners 5Y of the main pad 5A of the release pad 5 that is held horizontal over the cup-like hub 2A to pass into the cup-like hub 2A along with the lock release pins 5B. Each cutout 2K has an arc larger than that of each corner 5Y and is located right above each guide hole 2D which is made inside the cup-like hub 2A.

In the assembly of the magnetic tape cartridge according to the second embodiment, the release pad 5 is mounted inside the cup-like hub 2A of the reel 2 by an assembly robot (not shown). The assembly robot inserts a pair of chucks CH into two of the three chuck guide holes 5E and holds the main pad 5A (see FIG. 9). And the assembly robot, as shown in FIG. 10, carries the release pad 5 right above the cup-like hub 2A of the reel 2, and adjusts rotationally each corner 5Y to be right above each cutout 2K of the upper flange 2G while the main pad 5A is held in an approximately horizontal mounting position in advance.

Subsequently, the assembly robot lowers the release pad 5 in the direction of the axis of the reel 2, each lock release pin 5B toward the cup-like hub 2A while the main pad 5A is kept in an approximately horizontal mounting position. This operation allows each corner 5Y to pass each cutout 2K of the upper flange 2G along with each lock release pin 5B, thereby bringing the release pad 5 into the cup-like hub 2A (see FIG. 11).

The assembly robot lowers the release pad 5 further and brings each lock release pin 5B from above close to each guide hole 2D inside the cup-like hub 2A. Each pair of guide ribs 2X, which is placed at both sides of each guide hole 2D, guides each lock release pin 5B, which approaches from above, to each guide hole 2D securely.

Subsequently, the robot opens the chuck CH to release holding of the main pad 5A, dropping the release pad 5 on the base plate 2B inside the cup-like hub 2A. The three of the lock release pins 5B of the release pad 5 are inserted into the guide holes 2D, and thereby the release pad 5 is mounted inside the cup-like hub 2A securely (see FIG. 11).

In the description of the magnetic tape cartridge according to the second embodiment, it is assumed that the main pad 5A of the release pad 5 is of an equilateral triangle plate and each lock release pin 5B is cylindrical. Though, the shape of the main pad 5A may be of a square, a star or a propeller; and the cross section of the lock release pin 5B may be of an oval, a triangle or a rectangle. The top view of each cutout 2K of the upper flange 2G is not limited to an arc as long as each cutout 2K is capable of allowing each corner 5Y of the release pad 5 to pass.

The magnetic tape cartridge according to the second embodiment achieves the first object of the present invention, enabling secure assembly of the release pad 5 with an assembly robot.

[Third Embodiment (Corresponding to Claim 7)]

The third embodiment of the present invention will be described referring to FIGS. 12 and 13.

Figure 12:
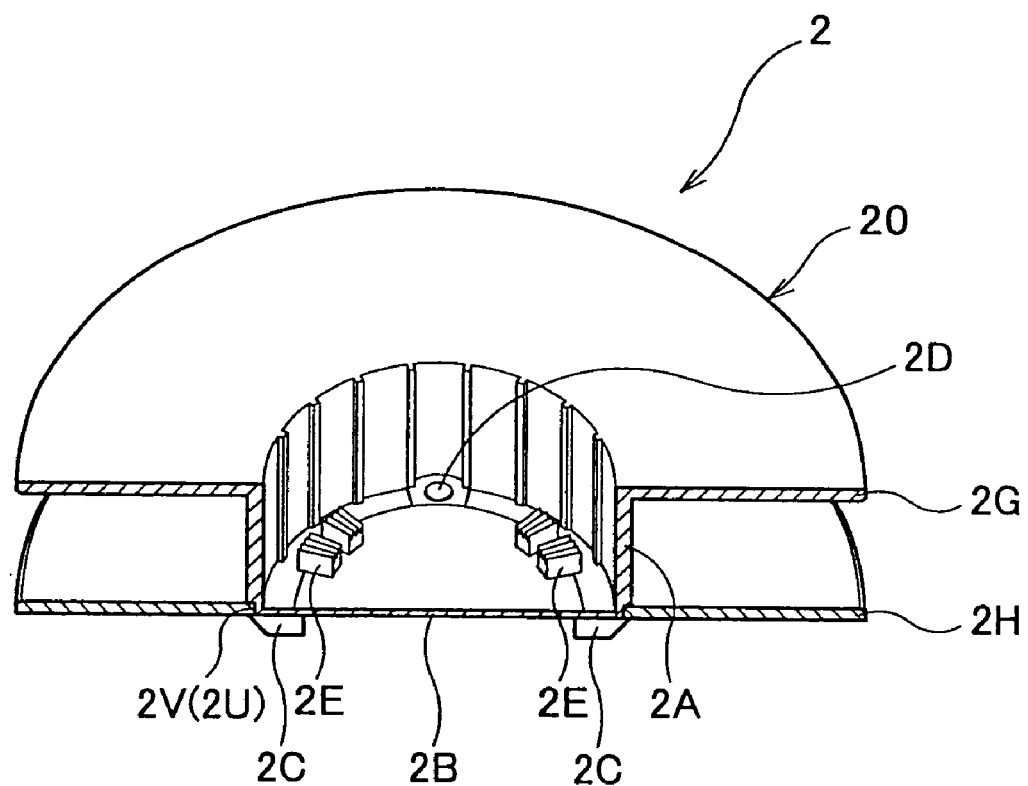
FIG. 12 is an enlarged perspective section view showing the reel according to the third embodiment.

As shown in FIG. 12 which shows an enlarged perspective section view of the reel 2, the reel 2 according to the third embodiment has a upper flanged hub 20, in which the upper flange 2G of a disk-like plate is integrally molded with the cup-like hub 2A at the edge of the upper opening. A lower flange 2H, which is a separate part and a disk-like plate with a circular fitting hole 2V in its center, is mated with and melt-bonded to the lower end of the outer circumference of the cup-like hub 2A with ultrasonic melt-bonding. In this connection, around the lower end of the outer circumference of the cup-like hub 2A is formed a positioning portion 2U, where the outer diameter is reduced to fit to the diameter of the fitting hole 2V for positioning the lower flange 2H.

Figure 13:
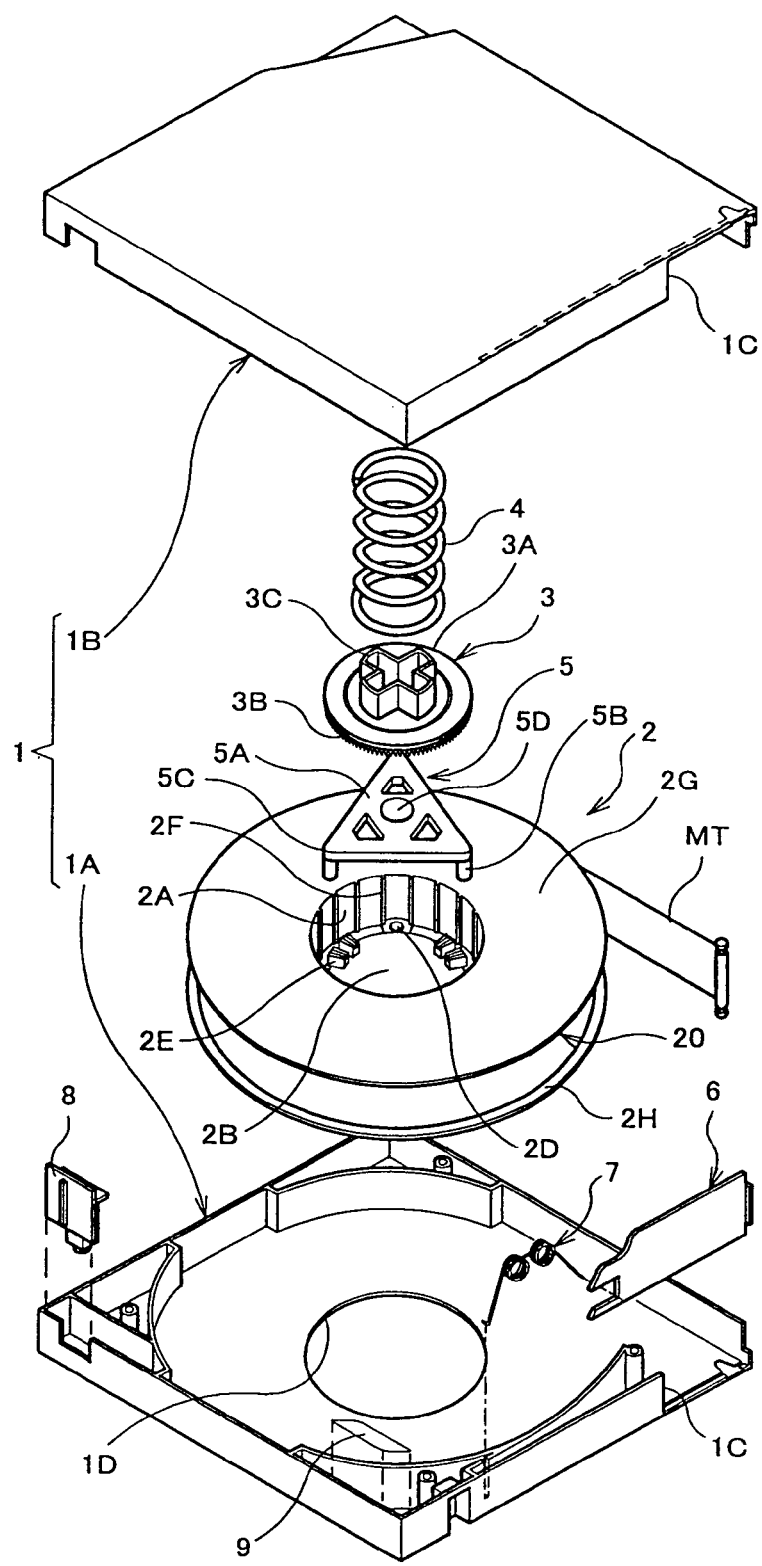
FIG. 13 is an exploded perspective view showing the structure of the magnetic tape cartridge according to the third embodiment.

FIG. 13 is an exploded perspective view illustrating the structure of the magnetic tape cartridge including the upper flanged hub 20 according to the third embodiment. The explanations will be omitted for the items of FIG. 13, which are the same as those of FIG. 1, bearing the same symbols.

The process for assembling the magnetic tape cartridge according to the third embodiment will be described referring to FIG. 13. First the reel 2 is placed on the lower half section 1A. Each lock release pin 5B is fitted into each guide hole 2D of the reel 2 and the release pad 5 is mounted inside the cup-like hub 2A of the reel 2. Next the lock plate 3 is placed on the release pad 5 in a prescribed position by inserting the lock plate 3 inside the cup-like hub 2A. Then the parts such as the compression coil spring 4 and the sliding door 6, etc. are mounted on the lower half section 1A, and the upper half section 1B is mated with and fixed to the lower half 1A by the screws (not shown).

Though the release pad 5 and the lock plate 3 are mounted close to the inner surface of the cylindrical wall 2Z of the cup-like hub 2A, the difficulty in the assembly caused by the clearance will not occur. The reason for it is that the smooth opening can be attained for the reel 2 according to the third embodiment since the upper flange 2G is integrally molded with the cup-like hub 2A. Therefore the release pad 5 and the lock plate 3 can be mounted only by dropping them without tilting. This allows easy and secure assembly when it is performed by a robot as well as a man.

It will now be appreciated from the foregoing description that the present invention is not limited to the particular illustrated embodiment discussed above and may be carried out in various modified forms. This invention allowing easy assembly can be applied not only to the release pad 5 and the lock plate 3 but also to any other parts that are mounted near the inner surface of the cylindrical wall 2Z of the cup-like hub 2A. This invention will especially benefit a great deal the assembly of a magnetic tape cartridge of LTO standard as described in the third embodiment, since the release pad 5, the lock release pins 5B of which are to be located on the circumference close to the cylindrical wall 2Z of the cup-like hub 2A, needs to be mounted in the cup-like hub 2A.

Not only the ultrasonic melt-bonding but also another melt-bonding such as the heat bonding, or other methods such as adhesion by an adhesive, force fit with a tightening margin, screw-in or fixing by a screw can be applied to fixing of the cup-like hub 2A and the lower flange 2H.

The reel 2 of the magnetic tape cartridge according to the third embodiment of the present invention achieves the second object of the present invention, thereby enabling easy mounting of the parts inside the cup-like hub 2A.

[Fourth Embodiment (Corresponding to Claim 8)]

The fourth embodiment of the present invention will be described referring to FIGS. 1 and 14.

Figure 14:
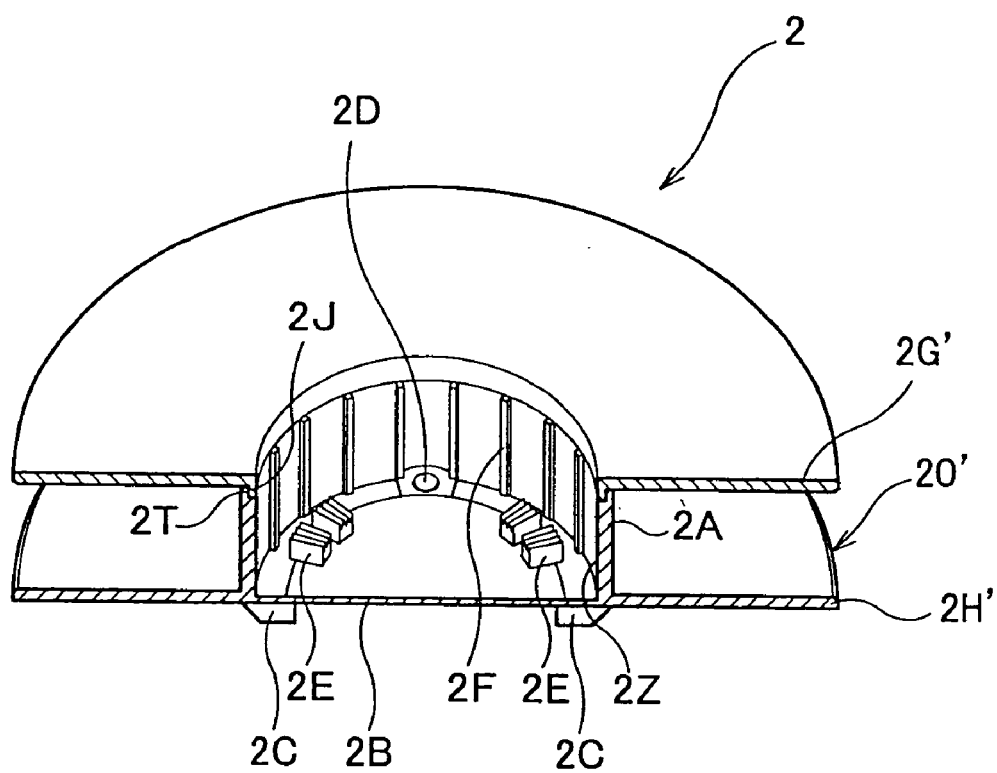
FIG. 14 is an enlarged perspective section view showing the reel according to the third embodiment.

As shown in FIG. 14 which shows an enlarged perspective section view of the reel 2, the reel 2 according to the fourth embodiment has a lower flanged hub 20', in which a lower flange 2H' of a disk-like plate is integrally molded with the cup-like hub 2A at the circumference of the base plate 2B. An upper flange 2G', which is a separate part and a disk-like plate, is melt-bonded to the edge of the opening of the cup-like hub 2A with the ultrasonic melt-bonding. A fitting rib 2J projects from the upper flange 2G' toward the cup-like hub 2A throughout around the hole made in the center of the upper flange 2C'. On the other hand, at the end of the opening of the cup-like hub 2A is formed a fitting portion 2T, in which the thickness of the cylindrical wall 2Z of the cup-like hub 2A is reduced or the inner diameter is increased for fitting it to the outer diameter of the fitting rib 2J. In this connection the fitting portion 2T is formed by reducing the thickness of the cylindrical wall 2Z by the thickness of the fitting rib 2J. Thus the inner diameter of the fitting rib 2J is in accordance with that of the cylindrical wall 2Z, and therefore the smooth opening of the cup-like hub 2A will be attained.

It would be preferable to determine the reduction in the thickness of the cylindrical wall 2Z of the cup-like hub 2A at the opening and the increase in the diameter of the fitting rib 2J by taking into account the position of the parts to be mounted inside the cup-like hub 2A. More specifically, it would be preferable to determine the inner diameter and thickness of the fitting rib 2J and the fitting portion 2T so that the area of the parts to be mounted may fall inside the projected inner diameter of the fitting rib 2J when the fitting rib 2J is projected to the base plate 2B of the cup-like hub 2A from above the opening, even if the inner diameter of the fitting rib 2J is smaller than that of the cylindrical wall 2Z. The parts thereby can be mounted easily since the clearance is maintained when they are lowered inside the cup-like hub 2A without tilting.

Applying the above discussion to the magnetic tape cartridge according to the fourth embodiment, the inner diameter and thickness of the fitting rib 2J and the fitting portion 2T are determined so that the clearance may be maintained by positioning the guide holes 2D of the reel 2 within the projected inner diameter of the fitting rib 2J, when the fitting rib 2J is projected to the base plate 2B of the cup-like hub 2A from above the opening.

The process for assembling the magnetic tape cartridge according to the fourth embodiment will be described below. First the reel 2 is placed on the lower half section 1A. Each lock release pin 5B is fitted into each guide hole 2D of the reel 2 and the release pad 5 is mounted inside the cup-like hub 2A of the reel 2. Next the lock plate 3 is placed on the release pad 5 in a prescribed position by inserting the lock plate 3 inside the cup-like hub 2A. Then the parts such as the compression coil spring 4 and the sliding door 6, etc. are mounted on the lower half section 1A, and the upper half section 1B is mated with and fixed to the lower half 1A by the screws (not shown).

Though the release pad 5 and the lock plate 3 are mounted close to the inner surface of the cylindrical wall 2Z of the cup-like hub 2A, the difficulty in the assembly caused by the clearance will not occur. The reason for it is that the diameter of the opening can be increased as much as the reduction in the thickness of the cylindrical wall 2Z of the cup-like hub 2A at the opening. Centering of the lower flanged hub 20' and the upper flange 2G' is performed by inserting the fitting rib 2J of the upper flange 2G' into the fitting portion 2T, which is formed at the opening of the cup-like hub 2A by reducing the thickness, thereby realizing the increase in the opening diameter. Therefore the release pad 5 and the lock plate 3 can be mounted only by dropping them without tilting. This allows easy and secure assembly when it is performed by a robot as well as a man.

It will now be appreciated from the foregoing description that the present invention is not limited to the particular illustrated embodiment discussed above and may be carried out in various modified forms. This invention can be applied not only to the release pad 5 and the lock plate 3 but also to any other parts which are mounted near the cylindrical wall 2Z of the cup-like hub 2A. This invention will especially benefit a great deal the assembly of a magnetic tape cartridge of LTO standard as described in the fourth embodiment, since the release pad 5, the lock release pins 5B of which are to be located on the circumference close to the cylindrical wall 2Z, needs to be mounted in the cup-like hub 2A.

Not only the ultrasonic melt-bonding but also another melt-bonding such as the heat bonding, or other methods such as adhesion by an adhesive, force fit with a tightening margin, screw-in or fixing by a screw can be applied to fixing of the cup-like hub 2A and the upper flange 2G'.

The reel 2 of the magnetic tape cartridge according to the fourth embodiment of the present invention achieves the second object of the present invention, thereby enabling easy mounting of the parts inside the cup-like hub 2A.

[Fifth Embodiment (Corresponding to Claim 9)]

The fifth embodiment of the present invention will be described referring to FIGS. 1 and 15–17.

Figure 15A:
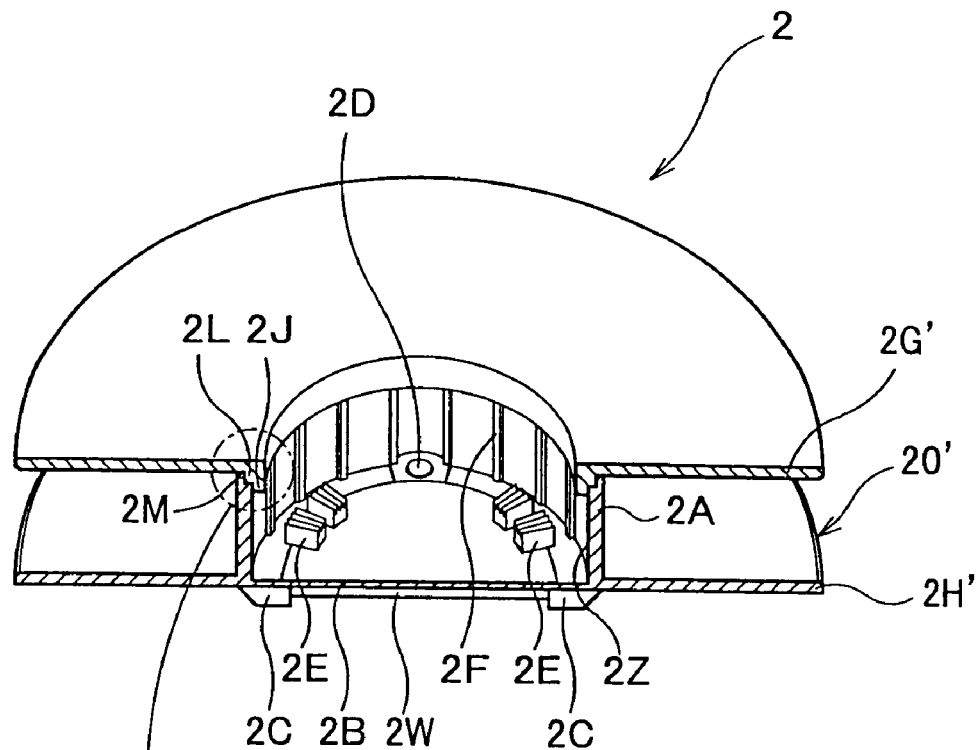
FIG. 15A is an enlarged perspective section view of the reel and FIG. 15B is an enlarged view illustrating the melt-bonded part of the flanged hub and the upper flange according to the fifth embodiment.
Figure 15B:
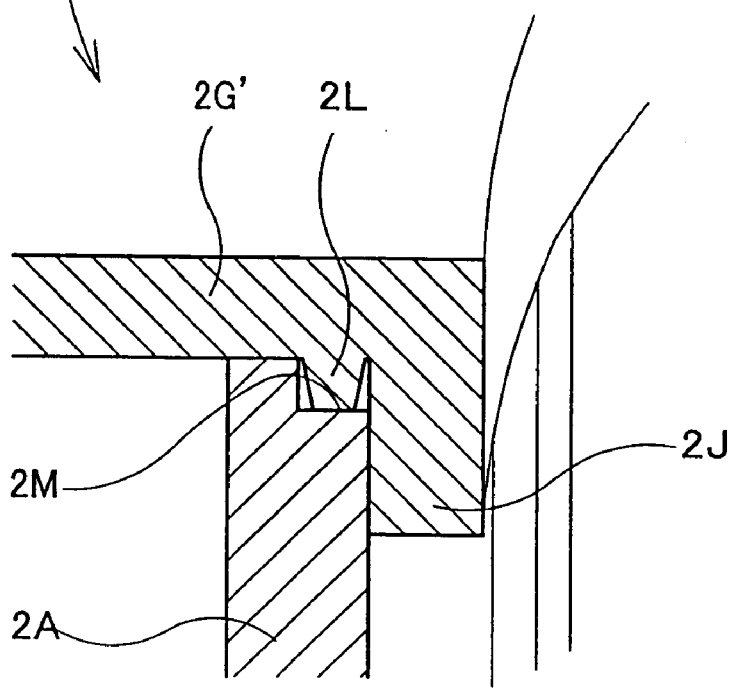

As shown in FIGS. 15A and 15B which show enlarged perspective section views of the reel 2, the reel 2 according to the fifth embodiment has the lower flanged hub 20', in which the lower flange 2H' of a disk-like plate is integrally molded with the cup-like hub 2A at the circumference of the base plate 2B. The upper flange 2G', which is a separate part and a disk-like plate, is melt-bonded to the edge of the opening of the cup-like hub 2A with ultrasonic melt-bonding. On the end of the opening of the cup-like hub 2A is formed a melt-bonding portion 2M, in which a step is made around the inner periphery. The fitting rib 2J projects from the upper flange 2G' toward the cup-like hub 2A throughout around the hole made in the center of the upper flange 2C'. The outer diameter of the fitting rib 2J is adjusted to fit to the diameter of the cylindrical wall 2Z so that the lower flanged hub 20' and the upper flange 2G' are centered. And a melt-bonding projection 2L, which is to melt at melt-bonding, projects from the rear surface of the upper flange 2G' throughout its circumference near the fitting rib 2J. The melt-bonding projection 2L shown in FIGS. 15A and 15B is melt-bonded to the melt-bonding portion 2M of the cup-like hub 2A.

Figure 16:
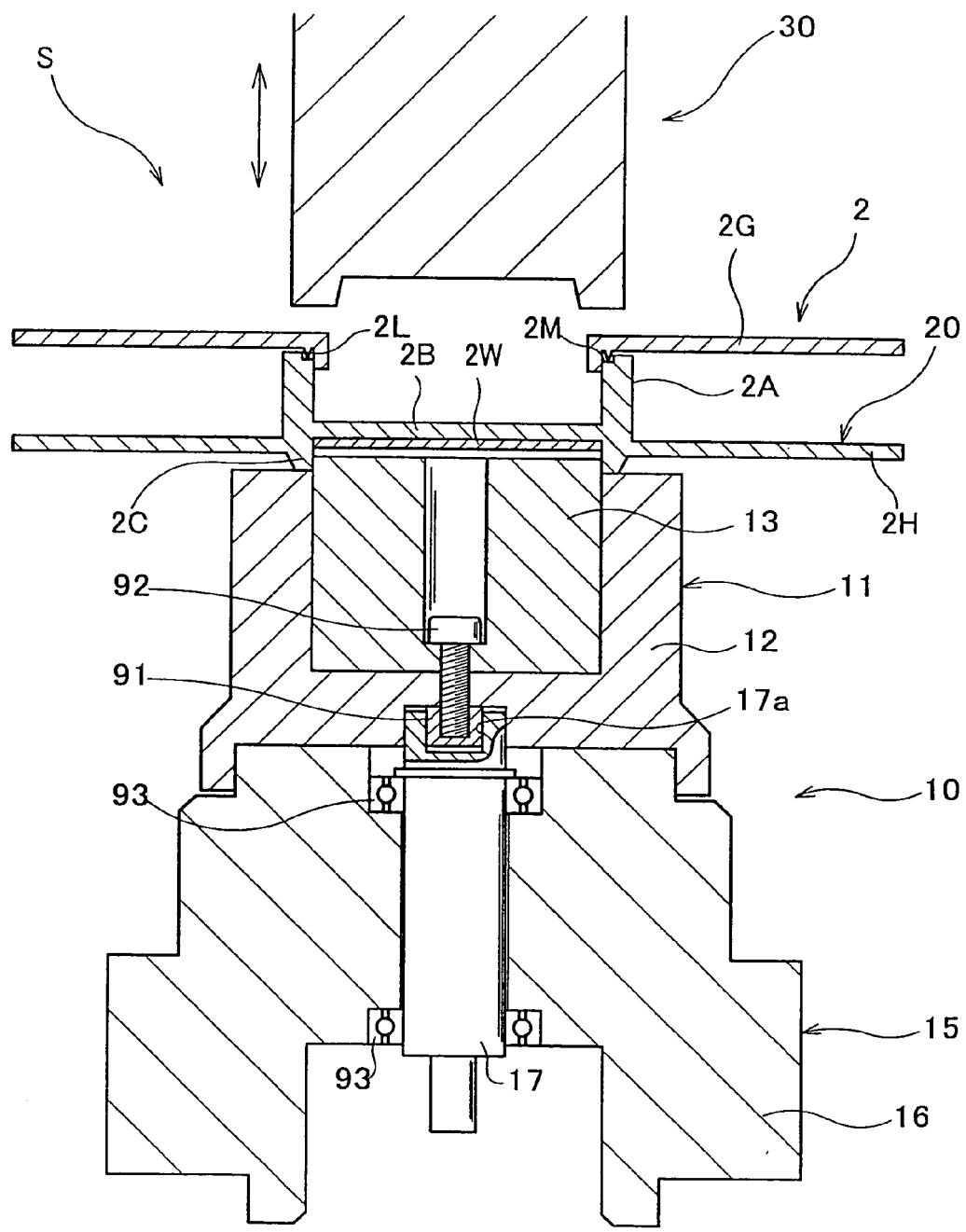
FIG. 16 is a section view showing the ultrasonic melt-bonding machine which is used for the melt-bonding of the reel according to the fifth embodiment.
Figure 17:
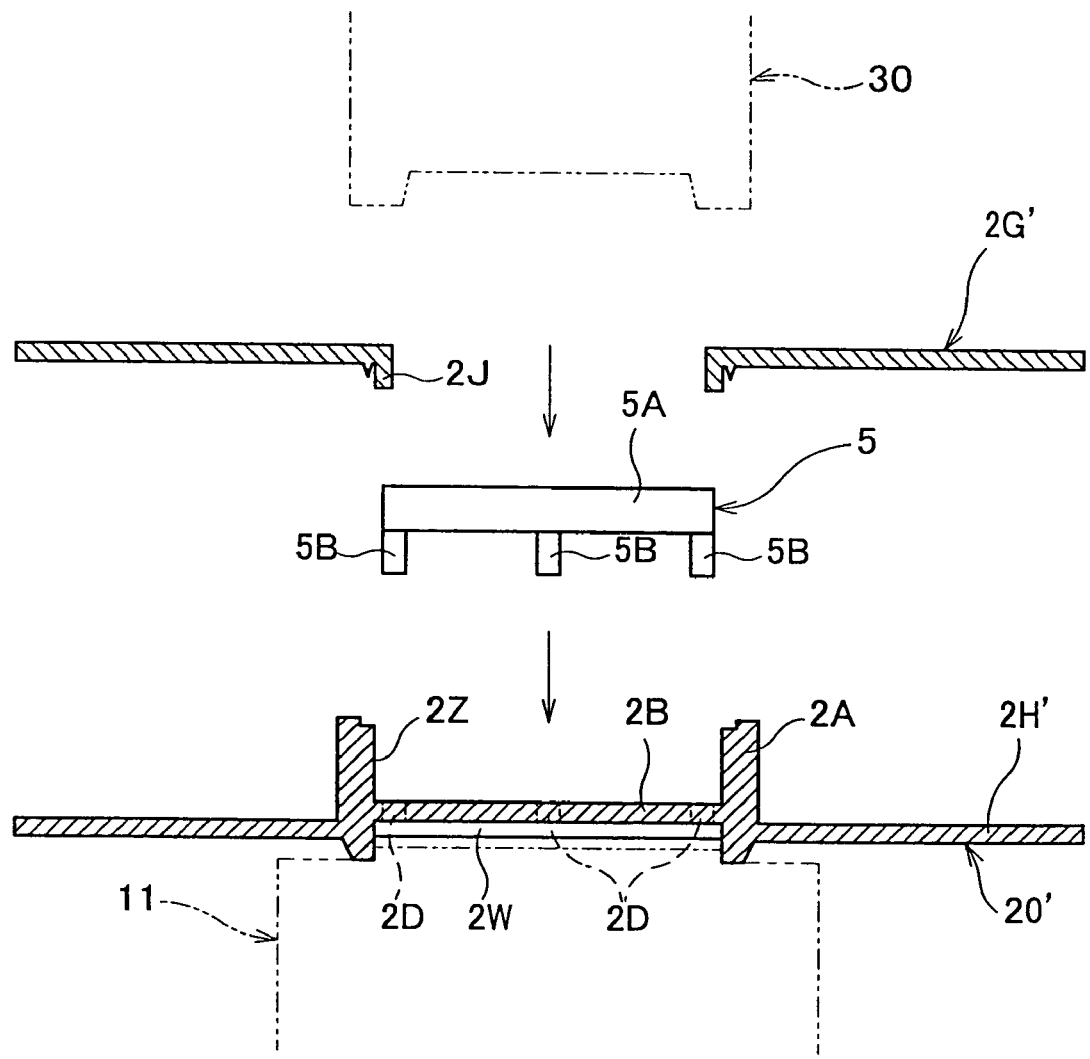
FIG. 17 is a section view showing the method for assembling the reel of the method for assembling the magnetic tape cartridge according to the fifth embodiment.

As shown in FIG. 16, an ultrasonic melt-bonding machine S, which is used for melt-bonding the upper flange 2G to the flange hub 20' of the reel 2, includes a table 10 on which the lower flanged hub 20' of a melt-bonded work is installed and a melt-bonding horn 30 which interposes the reel 2 with the table 10 and melt-bonds the upper flange 2G' to the lower flanged hub 20' generating ultrasonic waves. reel 2 at ultrasonic melt-bonding and a measurement table with rotation for measuring the surface deflection of the lower flange 2H' and the upper flange 2G', and a fixture 15 on which the rotation table 11 is installed.

The rotation table 11 includes a cylindrical seat 12 with a base which can rotate on the fixture 15 as well as supporting the load at melt-bonding by holding the face gear 2C of the lower flanged hub 20', a positioning cylinder 13 which is inserted into the cylindrical seat 12 and performs the positioning in contact with the inside of the face gear 2C, a rotation joint 91 which receives the rotation torque of a rotation shaft 17 of the fixture 15 with a key or a spline and a bolt 92 which connects the items mentioned above. The positioning cylinder 13 is made of a magnetic material and capable of attracting the metal plate 2W of the lower flanged hub 20' with magnetic force, thereby fixing the lower flanged hub 20' on the rotation table 11.

The rotation shaft 17 has a joint hole 17a, which engages with the rotation joint 91, transfers the rotation torque to the rotation table 11. The rotation shaft 17, the end of which is connected to a stepping motor or a servo motor (not shown), is given a rotational control.

The fixture 15 includes a base 16 secured on the table (not shown), which is for mounting the ultrasonic melt-bonding machine S, and the rotation shaft 17 which is supported rotationally free by upper and lower radial ball bearings 93 within the hole provided in the center of the base 16.

The melt-bonding horn 30 generates ultrasonic waves and vibrates the lower flanged hub 20' and the upper flange 2G' to produce frictional heat, thereby melt-bonding the melt-bonding portion 2M and the melt-bonding projection 2L. The melt-bonding horn 30, which has the equivalent diameter as that of the cup-like hub 2A in order to be in contact with the rim of the opening of the upper flange 2G', can be handled by an operator; such as lowering, pressurizing, generating ultrasonic waves and lifting.

Next the method for assembling the magnetic tape cartridge will be described.

The method for assembling the reel 2 will be described first. As shown-in FIG. 17, the lower flanged hub 20' is fixed on the rotation table 11 of the ultrasonic melt-bonding machine S with magnetic force. The release pad 5 is mounted inside the cup-like hub 2A of the lower flanged hub 20'. The release pad 5 is mounted inside the cup-like hub 2A by lowering it in a horizontal position and fitting each lock release pin 5B into each guide hole 2D on the base plate 2B of the cup-like hub 2A, since the upper flange 2G' has not yet been mounted on the lower flanged hub 20'. Then the upper flange 2G' is mounted on the opening of the cup-like hub 2A of the lower flanged hub 20', on which the release pad 5 has been mounted. The lower flanged hub 20' and the upper flange 2G' are melt-bonded by the melt-bonding horn 30.

The reel 2 assembled as described above is carried to the assembly line after the magnetic tape MT is wound around the cup-like hub 2A and the reel 2 is mounted on the lower half section 1A. On the -assembly line, various parts such as the lower half section 1A on which the reel 2 is mounted, the upper half section 1B and the sliding door 6 are set in a prescribed position on the carrying pallet, which moves on the belt conveyer (not shown). When the pallet stops at a prescribed position, the robot (not shown) mounts the various parts on the lower half section 1A sequentially, and finally it mates the upper half section 1B with the lower half section 1A.

The present invention according to claim 9 can attain the benefits described below.

Since the main pad 5A can be mounted inside the cup-like hub 2A by lowering it in a horizontal position, it is not necessary to insert the release pad 5 under the fitting rib 2J with tilting, thereby allowing easy assembling. Further the assembly can be performed only such a simple operation as lowering the release pad 5 straight. This allows easy and secure assembly when it is performed by a robot as well as a man.

It will now be appreciated from the foregoing description that the present invention is not limited to the particular illustrated embodiment discussed above and may be carried out in various modified forms. This invention can be applied not only to the release pad 5 but also to any other parts which are mounted near the inner surface of the cylindrical wall 2Z of the cup-like hub 2A. This invention will especially benefit a great deal the assembly of a magnetic tape cartridge of LTO standard as described in the fifth embodiment, since the release pad 5 needs to be assembled, the lock release pins 5B of which are located on the circumference close to the inner surface of the cylindrical wall 2Z of the cup-like hub 2A.

Not only the ultrasonic melt-bonding but also another melt-bonding such as the heat bonding, or other methods such as adhesion by an adhesive, force fit with a tightening margin, screw-in or fixing by a screw can be applied to fixing of the lower flanged hub 20' and the upper flange 2G'.

The method for assembling the magnetic tape cartridge according to the fifth embodiment of the present invention achieves the third object of the present invention, thereby enabling easy mounting of the parts such as the release pad 5 inside the cup-like hub 2A of the reel 2.

[Sixth Embodiment (Corresponding to Claim 11)]

The sixth embodiment of the present invention will be described referring to FIGS. 1 and 18–22.

First Aspect

Figure 18:
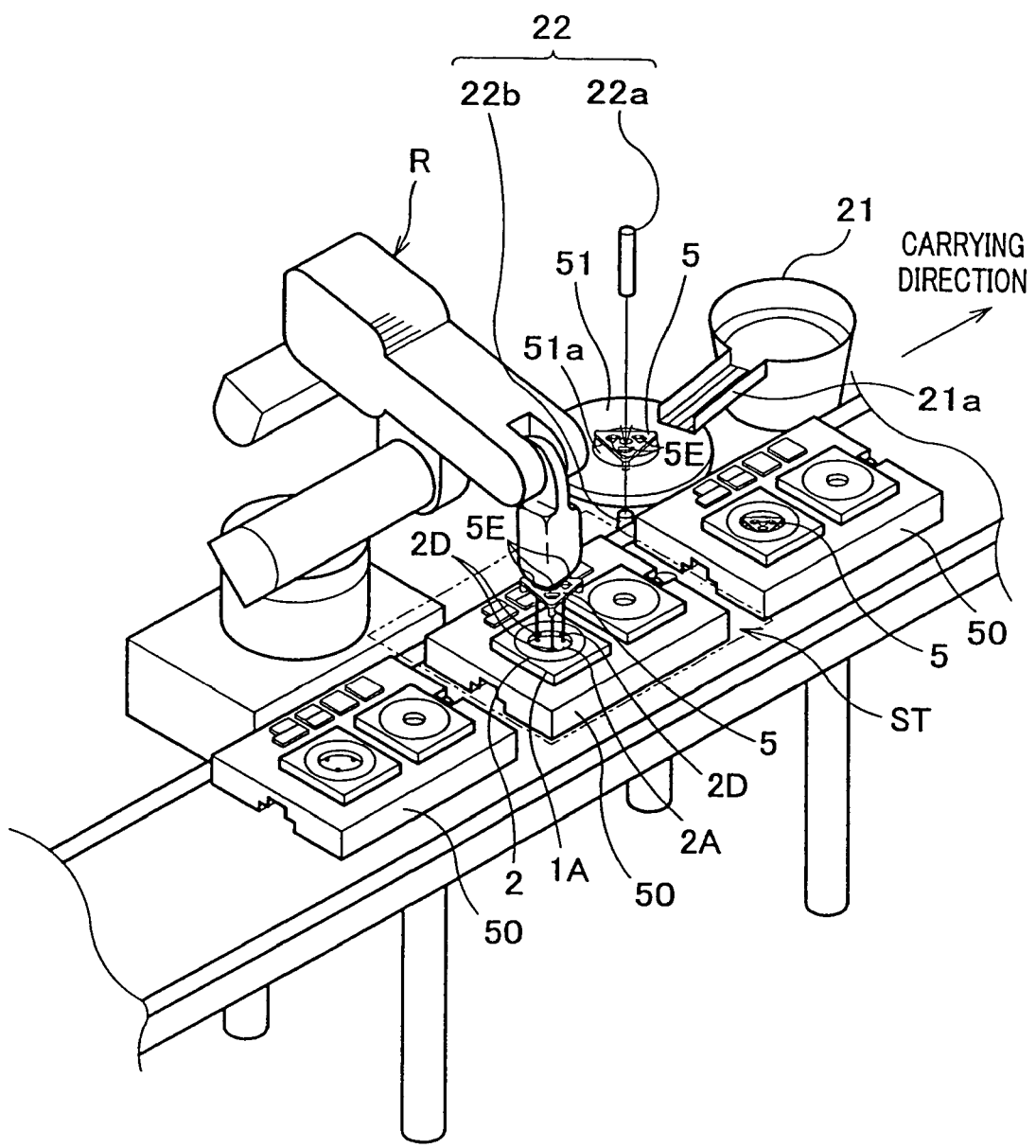
FIG. 18 is an illustrative view of the assembly station of the magnetic tape cartridge according to the sixth embodiment (first aspect).
Figure 19:
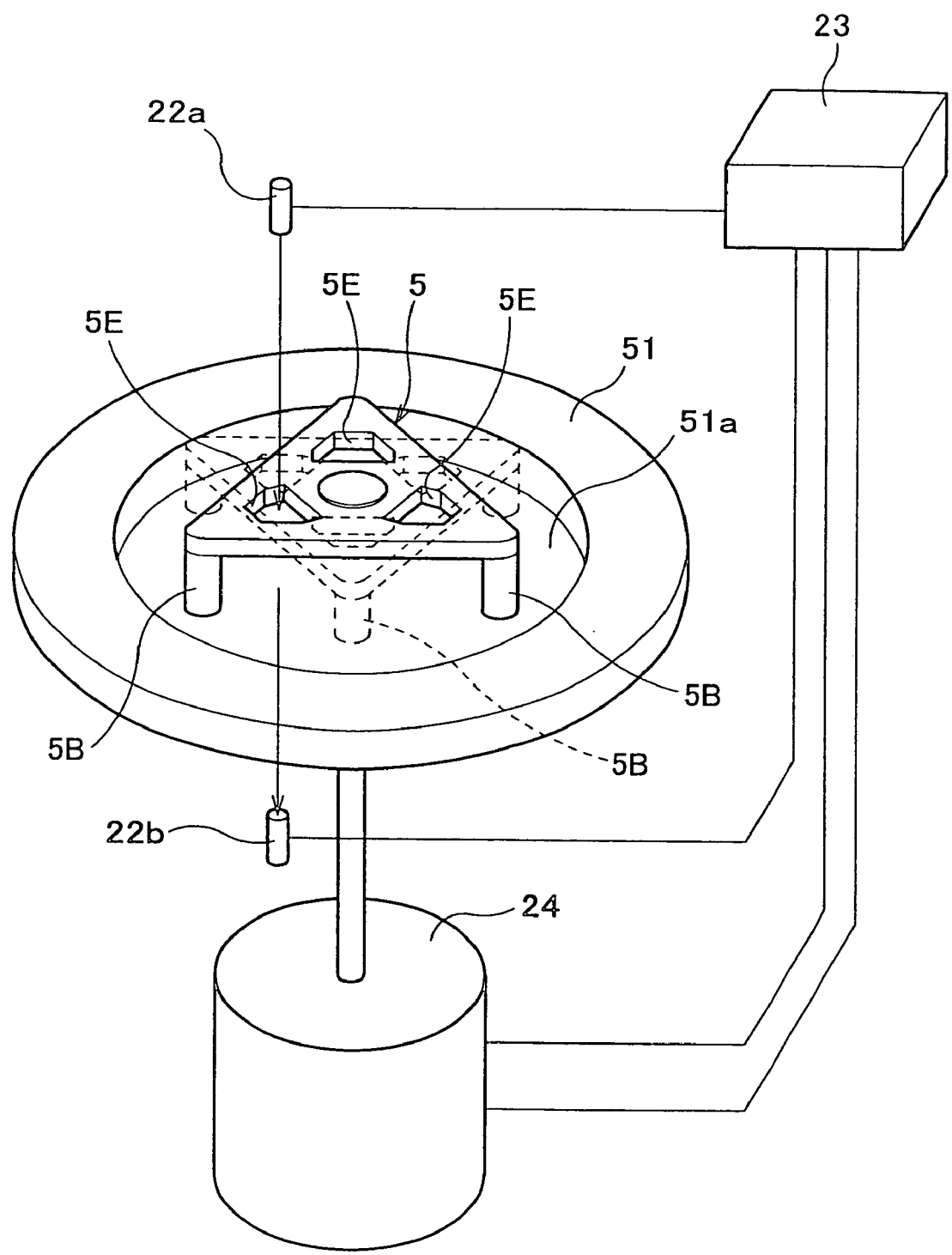
FIG. 19 is a view of details illustrating the main part of the direction correction unit of the release pad of the magnetic tape cartridge shown in FIG. 18 according to the sixth embodiment (first aspect).

FIG. 18 shows the station for assembling the magnetic tape cartridge and FIG. 19 shows the structure of the direction correction equipment for the release pad 5 shown in FIG. 18.

As shown in FIG. 18, a robot R is provided for an assembly station ST for assembling the parts. The robot R picks up the release pad 5 from a tray 50 stopped in the assembly station ST and mount it on the cup-like hub 2A of the reel 2, which is mounted on the upper section 1B. Near the assembly station ST are placed a rotation table 51 for changing the horizontal direction of the release pad 5, a part supply unit 21 for supplying the release pad 5 in series to the rotation table 51 and a detection unit 22 of a pair of photoelectric sensors 22a and 22b.

The rotation table 51 has a concave portion 51a in its center for positioning centrally the release pad 5 supplied by a shoot 21a of the part supply unit 21.

As shown in FIG. 19, the concave portion 51a is configured as a circle seeing from above so that the horizontal direction defined by the three chuck guide holes 5E may be corrected by rotating the release pad 5 around the center axis of the rotation table 51 within the concave portion 51a. Each lock release pin 5B is placed at the same angle as that of each chuck guide hole 5E circumferentially and outside it radially.

The base of the concave portion 51a is made of a transparent material of good transparency such as hard acrylic or hard glass so that the pair of photoelectric sensors 22a and 22b can detect the horizontal direction of the release pad 5.

The pair of photoelectric sensors 22a and 22b are disposed over and under the concave portion 51a interposing the pitch circle of the three chuck guide holes 5E of the release pad 5. Further the pair of photoelectric sensors 22a and 22b are so arranged that one photoelectric sensor (hereinafter referred to as a receiving photoelectric sensor) 22b may receive the light projected by the other photoelectric sensor (hereinafter referred to as a projecting photoelectric sensor) 22a, when the horizontal direction of the release pad 5 is in accordance with that of the reel 2 defined by the three guide holes 2D of the cup-like hub 2A (see FIG. 18). The light comes through the chuck guide hole 5E after it is transmitted by the base of the concave portion 51a.

A direction control unit 23 has a computer including memories, I/O and CPU. The direction control unit 23 determines whether the horizontal direction defined by the three chuck guide holes 5E of the release pad 5 is in accordance with the horizontal direction of the reel 2 and sends the control signal to the motor drive circuit (not shown) of a drive motor 24 which drives the rotation table 51 based on the results of determination, every time the part supply unit 21 shown in FIG. 18 generates a supply signal of the release pad 5.

The direction control unit 23 determines that the horizontal directions are in accordance when the horizontal direction of the release pad 5 is in accordance with that of the reel 2 defined by the three guide holes 2D of the cup-like hub 2A, while the projecting photoelectric sensor 22a projects the detection light and the receiving photoelectric sensor 22b receives it. Otherwise the direction control unit 23 determines that the horizontal directions are in disagreement. The direction control unit 23 sends the robot R a signal of permission for mounting the release pad 5 when the horizontal direction of the release pad 5 is in accordance with that of the reel 2. Otherwise, it will rotate the drive motor 24 by sending the drive signal to the drive circuit of the drive motor 24 till the receiving photoelectric sensor 22b receives the detection light projected by the projecting photoelectric sensor 22a.

When the signal of permission for mounting is sent by the direction control unit 23, the robot R inserts the chuck (not shown) into the three chuck guide holes 5E of the release pad 5 and holds the release pad 5 as shown in FIG. 18. Subsequently the robot R picks up the release pad 5 from the rotation table 51 and carries it to the mounting position over the opening of the cup-like hub 2A. The mounting position is defined as the position where the axes of the cup-like hub 2A and the release pad 5 are in agreement, and the axis of each guide hole 2D and that of each lock release pin 5B are also in agreement. Then the robot R lowers the release pad 5 at the mounting position to fit the three cylindrical lock release pins 5B (only two shown) into the three guide holes 2D. When the fitting is completed, the robot R releases the chuck and separates the release pad 5, moving back over the rotation table 51 to wait for the subsequent mounting.

Second Aspect

The second aspect of the sixth embodiment applied to the mounting of the release pad 5 will be described referring to FIGS. 20–22. The detail description would be omitted for the items, which are the same as those of the first aspect, baring the same symbols.

Figure 20:
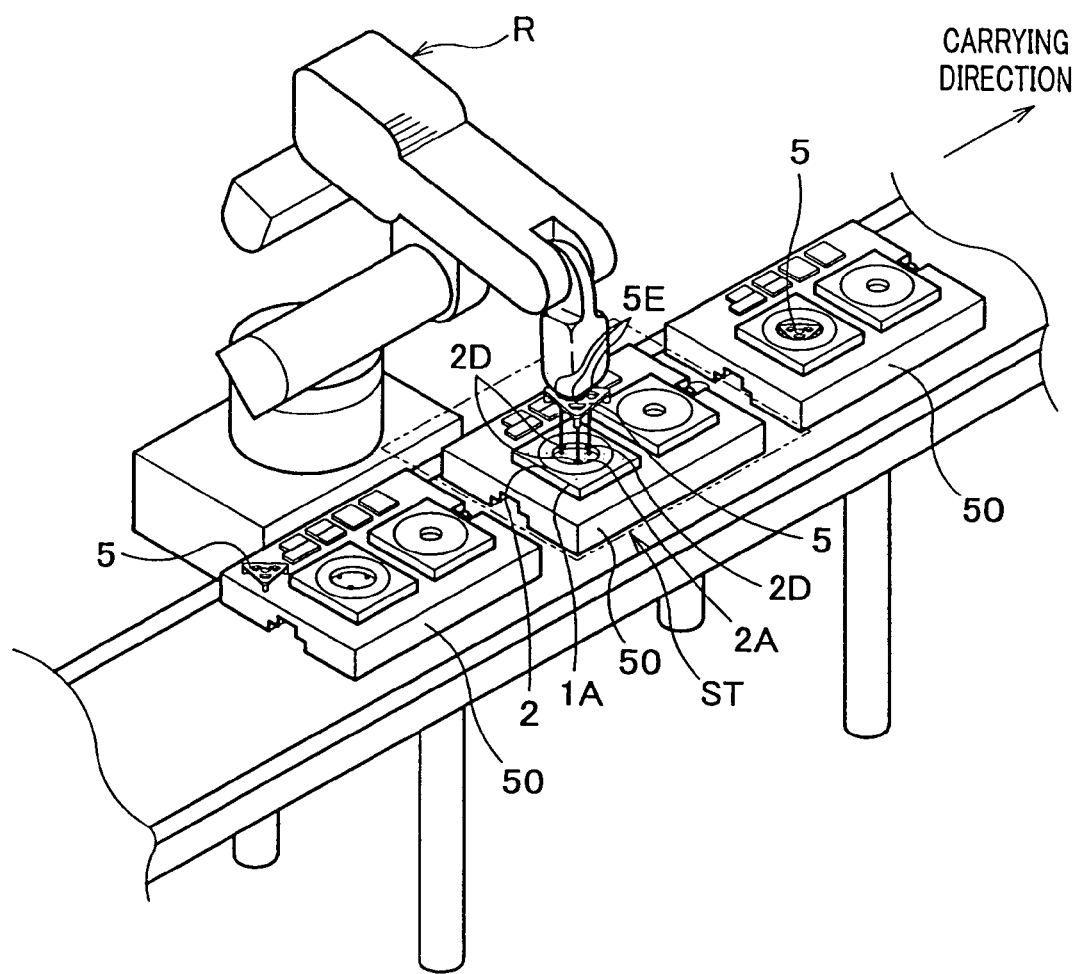
FIG. 20 is an illustrative view of the assembly station of the magnetic tape cartridge according to the sixth embodiment (second aspect).

FIG. 20 shows the assembly station for the magnetic tape cartridge. FIG. 21 is a section view illustrating the tray 50, and the lower half 1A and the reel 2 which are mounted on the tray 50. FIG. 22 is a top view seeing the lower half 1A and the release pad 5 from above the tray 50. It is assumed that the horizontal direction of the release pad 5 defined by the lock release pins 5B is known, on the other hand the horizontal direction of the reel 2 defined by the guide holes 2D of the cup-like hub 2A is unknown. It is also assumed that the release pad 5 is held by the robot R and positioned over the cup-like hub 2A in FIGS. 21 and 22.

Figure 21:
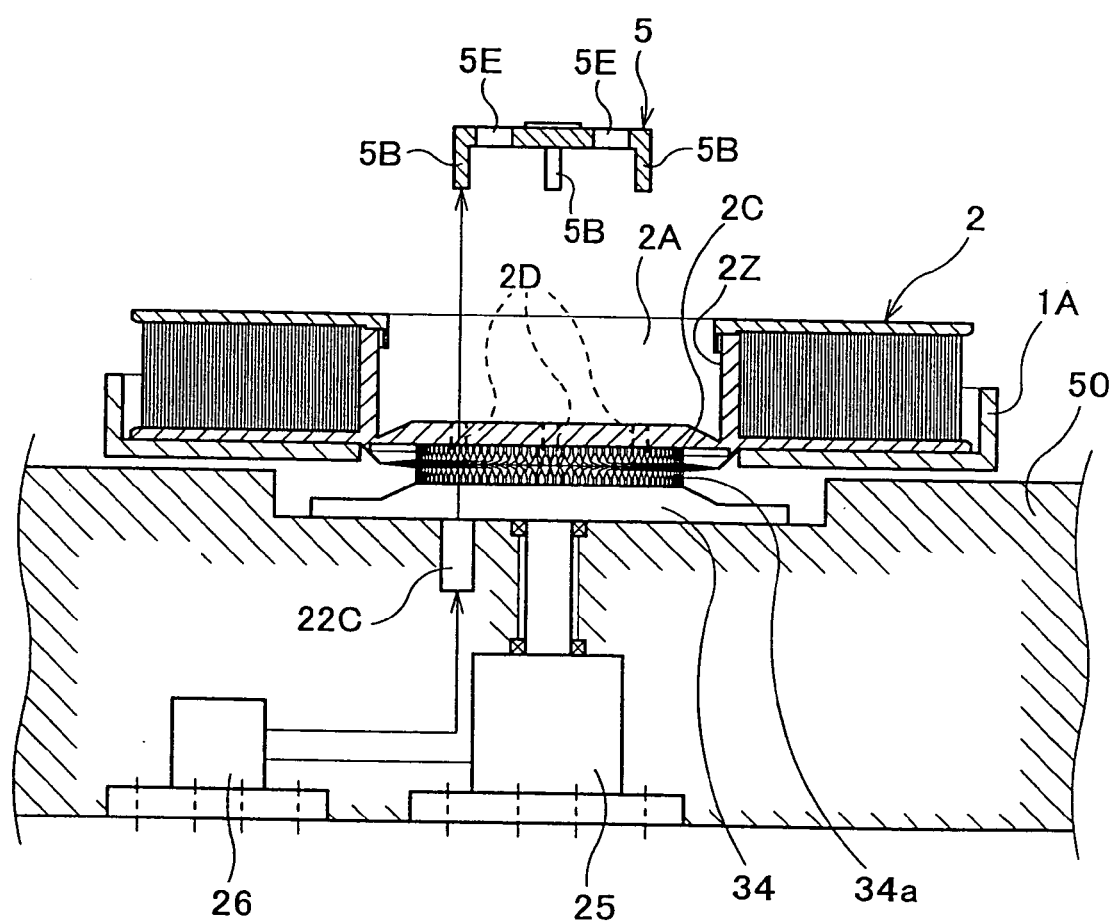
FIG. 21 is a view illustrating the direction correction unit of the release pad of the magnetic tape cartridge according to the sixth embodiment (second aspect).
Figure 22:
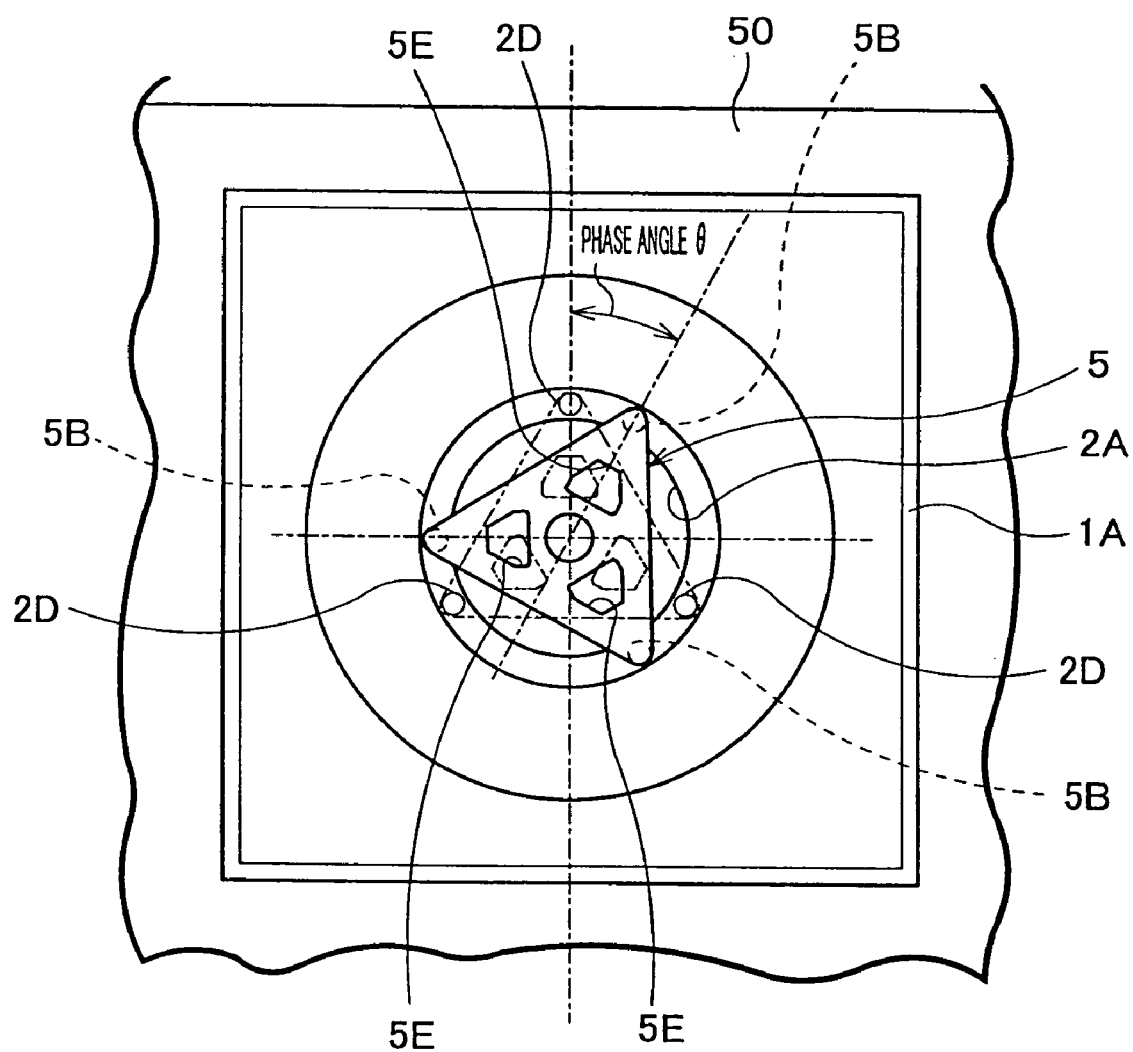
FIG. 22 is a view illustrating the lower half section and the release pad seeing from above the tray according to the sixth embodiment (second aspect).
Figure 23:
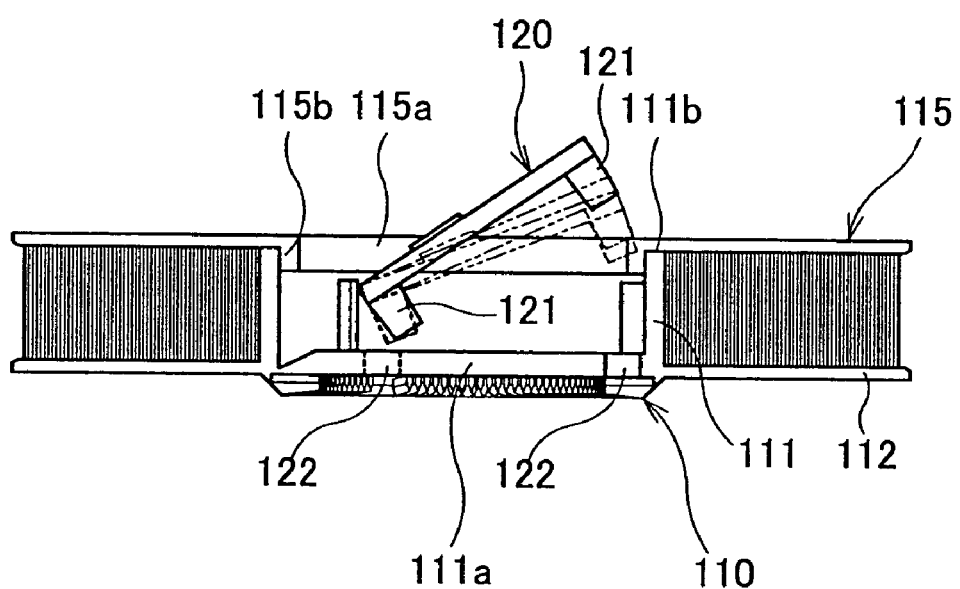
FIG. 23 is a section view showing the reel of the prior art.

As shown in FIG. 21, a rotation table 34, which engages with the face gear 2C of the lower half 1A to rotate the reel 2, is placed on the tray 50.

A face gear 34a, which is for driving the reel 2, engages with the face gear 2C under the reel 2 on the rotation table 34. Inside the tray 50 are housed a drive motor 25 for driving the rotation table 34, a projecting/receiving sensor 22C for detecting the horizontal direction of the reel 2 defined by the guide holes 2D of the cup-like hub 2A and a direction control unit 26.

The projecting/receiving sensor 22C is an integrated sensor of projecting photoelectric sensor 22a and the receiving photoelectric sensor 22b described in FIG. 18, which receives the reflected light that is projected by itself.

The rotation table 34 is made of a transparent material of good transparency such as hard acrylic or hard glass. The projecting/receiving sensor 22C is placed on the tray 50 so that the detection light may be projected from under the cup-like hub 2A of the reel 2 engaging with the face gear 34a of the rotation table 34 and pass through the guide holes 2D of the cup-like hub 2A.

The direction control unit 26 has a computer including memories, I/O and CPU. The direction control unit 26 determines that the horizontal direction of the release pad 5 defined by the lock release pins 5B held by the robot R is in accordance with that of the reel 2 defined by the guide holes of 5D of the cup-like hub 2A when the detection light projected by the projecting/receiving sensor 22C passes through the guide holes 2D of the cup-like hub 2A. Otherwise the direction control unit 26 determines that the horizontal directions are in disagreement.

The direction control unit 26 sends the robot R shown in FIG. 20 a signal of permission for mounting the release pad 5 when the horizontal direction of the release pad 5 is in accordance with that of the reel 2, otherwise it will rotate the drive motor 25, by sending the drive signal to the drive circuit of the drive motor 25, to the position where the detection light projected by the projecting/receiving sensor 22C is not received by the same sensor 22C.

When the direction control unit 26 sends the signal of permission for mounting the release pad 5, as shown in FIG. 20, the robot R starts descending keeping the hold of the release pad 5, and fits the three cylindrical lock release pins 5B (only two shown) into the three guide holes 2D of the base 2B of the cup-like hub 2A. When the fitting is completed, the robot R releases the chuck and separates the release pad 5, waiting for the arrival of another subsequent tray 50 to the assembly station ST. When the tray 50 arrives at the assembly station ST, the robot R moves over another release pad 5 on the tray 50 and picks up the release pad 5 by inserting the chuck (not shown) into the three chuck guide holes 5E. The robot R moves to the mounting position over the opening of another cup-like hub 2A and waits for the signal of permission for mounting by the direction control unit 26.

Therefore, the second aspect of the sixth embodiment enables a secure mounting of the release pad 5 on the cup-like hub 2A by fitting the lock release pins 5B of the release pad 5 into the guide holes 2D of the cup-like hub 2A.

It has been described that the assembly of the release pad 5 and the reel 2 is performed by detecting the direction of the former or the latter by the projecting photoelectric sensor 22a and the receiving photoelectric sensor 22b in the first aspect of the sixth embodiment, or the projecting/receiving sensor 22C in the second aspect, and correcting the direction of the release pad 5 or the reel 2 based on the detected data. Though, an image sensor such as a CCD camera may be employed as an alternative. In this case the horizontal direction of the reel 2 relative to that of the release pad 5 or vice versa is processed by the matching method with the reference image data stored in advance. And the correction is made to the horizontal direction of either the reel 2 or the release pad 5 according to the phase angle θ obtained by the matching method.

A clutch motor may be employed instead of the stepping motor, which is used for the drive motors 24 and 25 in the above description. In this case the clutch motor is kept in a drive condition by supplying the drive current continuously. The motor is stopped by braking the rotation table 51 or the shafts of the drive motors 24 and 25, when the receiving photoelectric sensor 22b receives the detection light or the projecting/receiving sensor 22C doesn't receive the reflected detection light. Thus the horizontal direction of the release pad 5 is in accordance with that of the reel 2.

A vibration unit may be mounted on the rotation table 51 to correct the position of the release pad 5 by applying vibration to it for positioning the release pad 5 on the concave portion 51a of the rotation table 51. And a photoelectric sensor (not shown), which is capable of detecting the existence of the release pad 5 by projecting the detection light onto the center of the release pad 5 and sensing the reflection, may be mounted on the base of the concave portion 51a. Thus the direction control is performed after confirming that the release pad 5 is placed in the concave portion 51a.

When a hemispherical or conical concave is provided in the center of the rear surface of the release pad 5, it may be so arranged that a projected support for the concave of the release pad 5 is provided on the center of the rotation table 51, and the upper surface of the rotation table 51 supports the lock release pins 5B.

The method for determining the relative position of the mounting parts of the magnetic tape cartridge according to the sixth embodiment of the present invention achieves the fourth object of the present invention, thereby enabling fitting of the parts by coordinating their horizontal directions at fitting.

What is claimed is:

1. A magnetic tape cartridge comprising:
   a reel around which a magnetic tape is wound;
   a cartridge case which houses said reel in a locked position;
   a release pad for releasing said reel from being locked, said release pad having a lower surface and a plurality of lock release pins which extend from said lower surface; and
   a cup-like hub of said reel in which said release pad is mounted, said cup-like hub having a base plate,
   wherein a plurality of guide holes, for allowing said plurality of lock release pins to penetrate therein, are made in a periphery of said base plate, and a plurality of pairs of guide ribs which are capable of respectively guiding said plurality of lock release pins to said plurality of guide holes, stand inside said cup-like hub corresponding to said plurality of guide holes, and
   wherein said plurality of pairs of guide ribs are respectively separated by a gap into which said plurality of lock release pins are respectively inserted, and the gap is increased in a direction towards a center of said base plate.

2. The magnetic tape cartridge according to claim 1, wherein the gap of each of said plurality of pairs of guide ribs is enlarged in a direction of an approach of said plurality of lock release pins, respectively, so that said plurality of pairs of guide ribs may guide said plurality of lock release pins to said plurality of guide holes smoothly.

3. The magnetic tape cartridge according to claim 1, wherein said plurality of pairs of guide ribs project from said base plate of said cup-like hub.

4. The magnetic tape cartridge according to claim 1, wherein said plurality of pairs of guide ribs project from said base plate and a cylindrical wall of said cup-like hub.

* * * * *